United States Patent
Fulghum et al.

(10) Patent No.: US 9,908,043 B2
(45) Date of Patent: Mar. 6, 2018

(54) GUITAR SHAPED VIDEO GAME CONTROLLER

(71) Applicant: Performance Designed Products LLC, Burbank, CA (US)

(72) Inventors: Eric Fulghum, Burbank, CA (US); Brad Strahle, Burbank, CA (US); Gaston Santiago, Burbank, CA (US); KK Leung, Burbank, CA (US); Raymond Leung, Burbank, CA (US); Jacky Kam, Burbank, CA (US)

(73) Assignee: Performance Designed Products LLC, San Diego, CA (US)

( * ) Notice: Subject to any disclaimer, the term of this patent is extended or adjusted under 35 U.S.C. 154(b) by 103 days.

(21) Appl. No.: 15/137,911

(22) Filed: Apr. 25, 2016

(65) Prior Publication Data
US 2017/0304720 A1    Oct. 26, 2017

(51) Int. Cl.
*A63F 13/245* (2014.01)
*A63F 13/814* (2014.01)

(52) U.S. Cl.
CPC .......... *A63F 13/245* (2014.09); *A63F 13/814* (2014.09)

(58) Field of Classification Search
CPC .................. A63F 13/814; A63F 13/245; A63F 2300/1043; A63F 2300/1062; A63F 2300/8047
USPC .......................................................... 463/37
See application file for complete search history.

(56) References Cited

U.S. PATENT DOCUMENTS

| | | | |
|---|---|---|---|
| 3,012,800 A | 12/1961 | Koch | |
| 4,073,211 A * | 2/1978 | Jorgensen | G10D 1/08 84/267 |
| 4,686,882 A * | 8/1987 | Shaw | G10D 1/08 84/291 |
| 5,353,672 A | 10/1994 | Stewart | |
| 5,928,028 A * | 7/1999 | Orsley | H01R 23/662 29/863 |
| 5,929,362 A | 7/1999 | Oteyza | |
| 6,028,255 A | 2/2000 | Myronyk | |
| 6,198,030 B1 * | 3/2001 | Rose | G10H 1/44 84/290 |
| 6,225,547 B1 | 5/2001 | Toyama et al. | |
| 7,375,267 B2 | 5/2008 | Poschelk | |
| 7,435,178 B1 | 10/2008 | Tam et al. | |
| 7,598,449 B2 | 10/2009 | Sullivan | |
| 8,182,342 B2 | 5/2012 | Guinchard et al. | |

(Continued)

FOREIGN PATENT DOCUMENTS

JP    2001096061 A    4/2001
WO    WO 9945528 A1 *    9/1999  ............... G10D 1/08

*Primary Examiner* — Michael Cuff
(74) *Attorney, Agent, or Firm* — Knobbe, Martens, Olson & Bear LLP

(57) ABSTRACT

A guitar-shaped video game controller includes a body having a shape that resembles a guitar body, and a neck that is pivotally coupled to the guitar body via a hinge so that the neck can pivot between an extended position and a folded position relative to the guitar body. A latch assembly is actuatable to selectively lock the neck in the extended position to the body. A cable extends between and electrically connects the neck and the body to maintain an electrical connection between the neck and the body when the neck is in the extended and the folded positions.

22 Claims, 22 Drawing Sheets

(56) References Cited

U.S. PATENT DOCUMENTS

| | | | |
|---|---|---|---|
| 8,975,501 B2* | 3/2015 | Roebke | G10H 3/18 84/615 |
| 9,633,871 B2* | 4/2017 | Hatano | H01L 21/50 |
| 2002/0152659 A1 | 10/2002 | Hartill | |
| 2003/0164080 A1 | 9/2003 | Childress | |
| 2004/0244569 A1* | 12/2004 | Teuffel | G10D 1/085 84/743 |
| 2006/0123971 A1 | 6/2006 | Moghaddam | |
| 2006/0230913 A1* | 10/2006 | Liao | G10H 1/32 84/744 |
| 2006/0246779 A1* | 11/2006 | Helbok | H01R 13/5205 439/606 |
| 2007/0151381 A1* | 7/2007 | Pelkonen | G06F 1/1616 74/437 |
| 2008/0220864 A1 | 9/2008 | Brosius et al. | |
| 2009/0088250 A1* | 4/2009 | Carlson | A63F 13/06 463/37 |
| 2009/0126152 A1* | 5/2009 | Potter | H04M 1/0216 16/251 |
| 2009/0156306 A1* | 6/2009 | Guinchard | A63F 13/06 463/37 |
| 2009/0258686 A1* | 10/2009 | McCauley | A63F 13/06 463/7 |
| 2009/0288547 A1* | 11/2009 | Lazovic | G10H 1/0066 84/645 |
| 2010/0009749 A1* | 1/2010 | Chrzanowski, Jr. | A63F 13/10 463/35 |
| 2010/0033426 A1* | 2/2010 | Grant | A63F 13/06 345/156 |
| 2010/0304865 A1* | 12/2010 | Picunko | A63F 13/245 463/37 |
| 2011/0028218 A1* | 2/2011 | Gomes | G09B 15/00 463/39 |
| 2011/0269543 A1* | 11/2011 | Johnson | G07F 17/3209 463/37 |
| 2013/0190092 A1* | 7/2013 | Adams | G10H 3/181 463/37 |
| 2014/0174227 A1* | 6/2014 | Hsu | E05D 3/14 74/98 |
| 2015/0165309 A1* | 6/2015 | Jackson | A63F 13/814 463/31 |
| 2015/0237711 A1* | 8/2015 | Rogers | H05K 1/028 174/251 |
| 2016/0090763 A1* | 3/2016 | Hsu | E05D 3/06 16/354 |

* cited by examiner

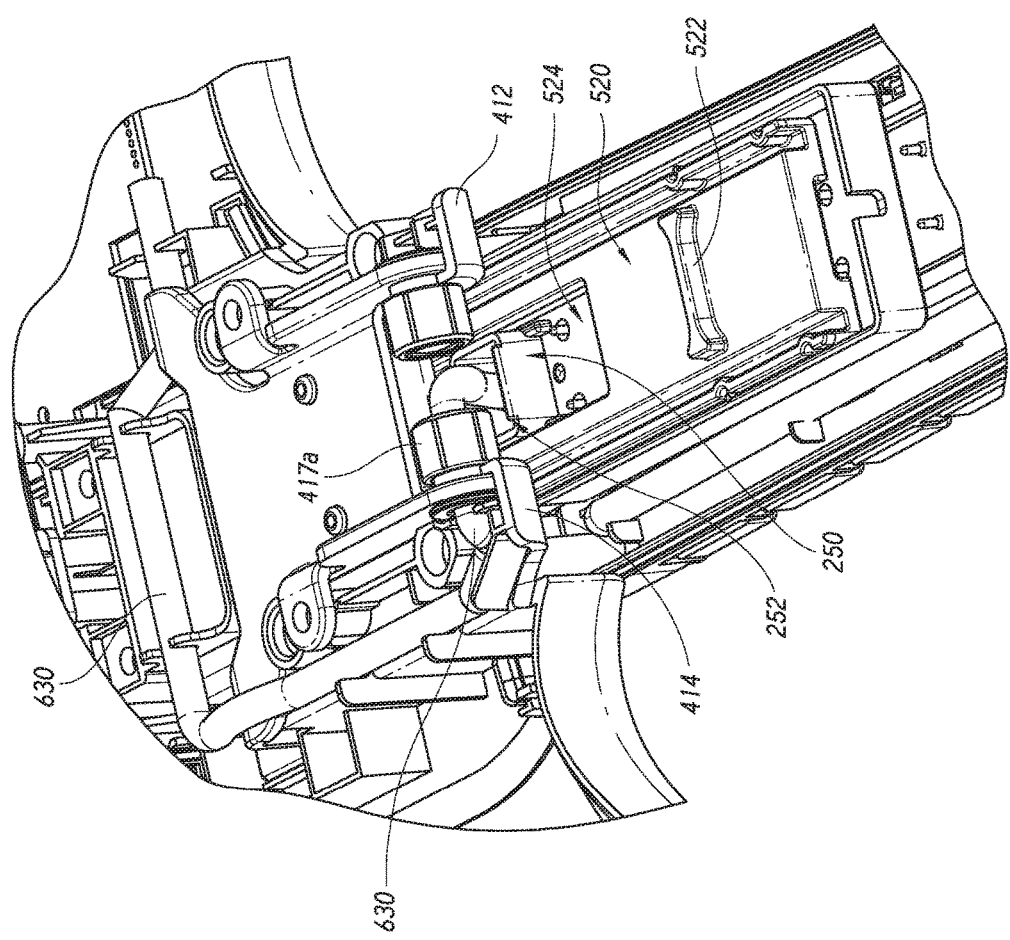

GUITAR SHAPED VIDEO GAME CONTROLLER

BACKGROUND

Field

The present invention is directed to a video game controller, and more particularly to a guitar-shaped video game controller.

Description of the Related Art

Video games allow users to provide inputs through a controller to play the game. Such video games include music video games that allow users to simulate the performance of a song by playing the game with controllers that resemble musical instruments, such as guitars.

SUMMARY

There is a need for an improved guitar shaped video game controller.

In accordance with one aspect, a guitar-shaped video game controller is provided. The controller comprises a body having a shape that resembles a guitar body, and a neck that is pivotally coupled to the guitar body via a hinge so that the neck can pivot between an extended position and a folded position relative to the guitar body.

The guitar-shaped video game controller may optionally be arranged to further include a latch mechanism comprising a latch connector configured to slide between a retracted position that allows the neck to pivot relative to the body, and a deployed position that locks the neck in an extended position to the body.

The guitar-shaped video game controller may optionally be arranged to further include a cable that extends between the neck and the body and that electrically connects the neck to the body irrespective of whether the neck is in the folded position or the extended position relative to the body. Optionally, the cable is a ribbon cable.

The guitar-shaped video game controller may optionally be arranged such that the cable extends between the neck and the body through the hinge.

In accordance with another aspect, a guitar-shaped video game controller is provided. The controller comprises a body having a shape that resembles a guitar body and one or more control inputs on a front surface of the body and a neck pivotally attached to the body via a hinge, the neck configured to pivot between an extended position and a folded position relative to the body. A latch assembly is actuatable by a user to lock the neck in the extended position to the body, the latch assembly comprising a latch connector configured to slide between a first position that allows the neck to pivot relative to the body and a second position in which the neck is locked in the extended position to the body.

The guitar-shaped video game controller may optionally be arranged such that the latch connector is disposed in a proximal portion of the neck.

The guitar-shaped video game controller may optionally be arranged such that in the first position the latch connector is retracted and in the second position the latch connector extends past a proximal end of the neck.

The guitar-shaped video game controller may optionally be arranged such that the proximal portion of the neck includes an opening through which at least a portion of the latch connector is accessible, the latch connector being actuatable by the user through the opening to slide the latch connector between the first and second positions.

The guitar-shaped video game controller may optionally be arranged such that the latch connector is a male connector that engages a female connector in the body. Optionally, the female connector is a slot in the body.

The guitar-shaped video game controller may optionally be arranged to further comprise a headstock detachable from a distal end of the neck.

The guitar-shaped video game controller may optionally be arranged such that the hinge comprises a yoke with a pair of arms and a knuckle that extends between the arms of the yoke, the knuckle configured to rotate relative to the arms when the neck is pivoted between the extended and the folded positions. Optionally, the knuckle is defined by the neck and the yoke is defined by the body.

The guitar-shaped video game controller may optionally be arranged such that in the extended position a proximal portion of the neck is at least partially disposed in a recess in the body.

The guitar-shaped video game controller may optionally be arranged such that in the folded position at least a portion of the neck is disposed adjacent a rear surface of the body.

In accordance with another aspect, a guitar-shaped video game controller is provided. The controller comprises a body having a shape that resembles a guitar body and one or more control inputs and a neck pivotally attached to the body via a hinge, the neck configured to pivot between an extended position and a folded position relative to the body. A latch assembly is actuatable by a user to lock the neck in the extended position to the body, the latch assembly comprising a latch connector in the neck that is configured to slide between a retracted position that allows the neck to pivot relative to the body and a deployed position in which the latch connector extends past a proximal end of the neck to lock the neck to the body.

The guitar-shaped video game controller may optionally be arranged such that the proximal portion of the neck includes an opening through which at least a portion of the latch connector is accessible, the latch connector being actuatable by the user through the opening to slide the latch connector between the retracted and deployed positions.

The guitar-shaped video game controller may optionally be arranged such that the latch connector is a male connector that engages a female connector in the body. Optionally, the female connector is a slot in the body.

The guitar-shaped video game controller may optionally be arranged such that it further comprises a headstock detachable from a distal end of the neck.

The guitar-shaped video game controller may optionally be arranged such that the hinge comprises a yoke with a pair of arms and a knuckle that extends between the arms of the yoke, the knuckle configured to rotate relative to the arms when the neck is pivoted between the extended and the folded positions. Optionally, the knuckle is defined by the neck and the yoke is defined by the body.

The guitar-shaped video game controller may optionally be arranged such that in the extended position a proximal portion of the neck is at least partially disposed in a recess in the body.

The guitar-shaped video game controller may optionally be arranged such that in the folded position at least a portion of the neck is disposed adjacent a rear surface of the body.

In accordance with another aspect, a guitar-shaped video game controller is provided. The controller comprises a body having a shape that resembles a guitar body and one or more control inputs and a neck pivotally attached to the body via a hinge, the neck configured to pivot between an extended position and a folded position relative to the body. The controller also comprises a latch assembly actuatable by a user to lock the neck in the extended position to the body, the latch assembly comprising a latch connector configured to slide between a first position that allows the neck to pivot relative to the body and a second position in which the neck is locked in the extended position to the body. The controller also comprises a ribbon cable that extends between and electrically connects the neck and the body, the ribbon cable configured to maintain an electrical connection between the neck and the body when the neck is in the extended and the folded positions.

The guitar-shaped video game controller may optionally be arranged such that it further comprises a spring configured to apply a tension force on the ribbon cable to inhibit slack in the ribbon cable while the neck pivots between the extended and folded positions. Optionally, the spring is disposed in the body.

The guitar-shaped video game controller may optionally be arranged such that the latch connector is disposed in a proximal portion of the neck. Optionally, in the first position the latch connector is retracted and in the second position the latch connector extends past a proximal end of the neck.

The guitar-shaped video game controller may optionally be arranged such that the proximal portion of the neck includes an opening through which at least a portion of the latch connector is accessible, the latch connector being actuatable by the user through the opening to slide the latch connector between the first and second positions.

The guitar-shaped video game controller may optionally be arranged such that the latch connector is a male connector that engages a female connector in the body. Optionally, the female connector is a slot in the body.

The guitar-shaped video game controller may optionally be arranged such that it further comprises a headstock detachable from a distal end of the neck.

The guitar-shaped video game controller may optionally be arranged such that the hinge comprises a yoke with a pair of arms and a knuckle that extends between the arms of the yoke, the knuckle configured to rotate relative to the arms when the neck is pivoted between the extended and the folded positions.

The guitar-shaped video game controller may optionally be arranged such that at least a portion of the ribbon cable passes through a slot in the knuckle.

The guitar-shaped video game controller may optionally be arranged such that the ribbon cable is at least partially disposed about the knuckle.

The guitar-shaped video game controller may optionally be arranged such that in the folded position at least a portion of the neck is disposed adjacent a rear surface of the body.

In accordance with another aspect, a guitar-shaped video game controller is provided. The controller comprises a body having a shape that resembles a guitar body and one or more control inputs and a neck pivotally attached to the body via a hinge, the neck configured to pivot between an extended position and a folded position relative to the body. The controller also comprises a latch assembly actuatable by a user to lock the neck in the extended position to the body, the latch assembly comprising a latch connector in the neck that is configured to slide between a retracted position that allows the neck to pivot relative to the body and a deployed position in which the latch connector extends past a proximal end of the neck and engages a slot in the body to thereby lock the neck to the body. The controller also comprises a ribbon cable that extends between and electrically connects the neck and the body, at least a portion of the ribbon cable extending at least partially about the hinge, the ribbon cable configured to maintain an electrical connection between the neck and the body when the neck is in the extended and the folded positions.

The guitar-shaped video game controller may optionally be arranged such that it further comprises a spring configured to apply a tension force on the ribbon cable to inhibit slack in the ribbon cable while the neck pivots between the extended and folded positions. Optionally, the spring is disposed in the body.

The guitar-shaped video game controller may optionally be arranged such that the proximal portion of the neck includes an opening through which at least a portion of the latch connector is accessible, the latch connector being actuatable by the user through the opening to slide the latch connector between the first and second positions.

The guitar-shaped video game controller may optionally be arranged such that it further comprises a headstock detachable from a distal end of the neck.

The guitar-shaped video game controller may optionally be arranged such that the hinge comprises a yoke with a pair of arms and a knuckle that extends between the arms of the yoke, the knuckle configured to rotate relative to the arms when the neck is pivoted between the extended and the folded positions.

The guitar-shaped video game controller may optionally be arranged such that at least a portion of the ribbon cable passes through a slot in the knuckle.

The guitar-shaped video game controller may optionally be arranged such that in the folded position at least a portion of the neck is disposed adjacent a rear surface of the body.

In accordance with another aspect, a guitar-shaped video game controller is provided. The controller comprises a body having a shape that resembles a guitar body and one or more control inputs and a neck pivotally attached to the body via a hinge, the neck configured to pivot between an extended position and a folded position relative to the body. The controller also comprises a latch assembly actuatable by a user to lock the neck in the extended position to the body, the latch assembly comprising a latch connector configured to slide between a first position that allows the neck to pivot relative to the body and a second position in which the neck is locked in the extended position to the body. The controller also comprises an electrical cable that extends between and electrically connects the neck and the body, the electrical cable configured to extend through the hinge and to maintain an electrical connection between the neck and the body when the neck is in the extended and the folded positions.

The guitar-shaped video game controller may optionally be arranged such that the latch connector is disposed in a proximal portion of the neck.

The guitar-shaped video game controller may optionally be arranged such that in the first position the latch connector is retracted and in the second position the latch connector extends past a proximal end of the neck.

The guitar-shaped video game controller may optionally be arranged such that the proximal portion of the neck includes an opening through which at least a portion of the latch connector is accessible, the latch connector being actuatable by the user through the opening to slide the latch connector between the first and second positions.

The guitar-shaped video game controller may optionally be arranged such that the latch connector is a male connector that engages a female connector in the body. Optionally, the female connector is a slot in the body.

The guitar-shaped video game controller may optionally be arranged such that it further comprises a headstock detachable from a distal end of the neck.

The guitar-shaped video game controller may optionally be arranged such that the hinge comprises a yoke with a pair of arms and a knuckle that extends between the arms of the yoke, the knuckle configured to rotate relative to the arms when the neck is pivoted between the extended and the folded positions.

The guitar-shaped video game controller may optionally be arranged such that at least a portion of the cable passes through a channel in the knuckle and an opening in one of the arms of the yoke.

The guitar-shaped video game controller may optionally be arranged such that the knuckle is defined by the neck and the yoke is defined by the body.

The guitar-shaped video game controller may optionally be arranged such that at least a portion of the cable passes through an opening in the latch connector, such that sliding of the latch connector between the retracted and deployed positions does not contact said at least a portion of the cable that passes through the opening in the latch connector.

The guitar-shaped video game controller may optionally be arranged such that the neck defines a conduit that extends through the opening in the latch connector, the conduit having a passage through which the cable passes, the conduit inhibiting contact between the latch connector and the cable when sliding the latch connector between the retracted and deployed positions.

The guitar-shaped video game controller may optionally be arranged such that in the folded position at least a portion of the neck is disposed adjacent a rear surface of the body.

In accordance with another aspect, a guitar-shaped video game controller is provided. The controller comprises a body having a shape that resembles a guitar body and one or more control inputs and a neck pivotally attached to the body via a hinge, the neck configured to pivot between an extended position and a folded position relative to the body. The controller also comprises a latch assembly actuatable by a user to lock the neck in the extended position to the body, the latch assembly comprising a latch connector in the neck that is configured to slide between a retracted position that allows the neck to pivot relative to the body and a deployed position in which the latch connector extends past a proximal end of the neck and engages a slot in the body to thereby lock the neck to the body. The neck also comprises an electrical cable that extends between and electrically connects the neck and the body, the electrical cable extending through the hinge and configured to maintain an electrical connection between the neck and the body when the neck is in the extended and the folded positions.

The guitar-shaped video game controller may optionally be arranged such that a proximal portion of the neck includes an opening through which at least a portion of the latch connector is accessible, the latch connector being actuatable by the user through the opening to slide the latch connector between the retracted and deployed positions.

The guitar-shaped video game controller may optionally be arranged such that it further comprises a headstock detachable from a distal end of the neck.

The guitar-shaped video game controller may optionally be arranged such that the hinge comprises a yoke with a pair of arms and a knuckle that extends between the arms of the yoke, the knuckle configured to rotate relative to the arms when the neck is pivoted between the extended and the folded positions.

The guitar-shaped video game controller may optionally be arranged such that at least a portion of the cable passes through a channel in the knuckle and an opening in one of the arms of the yoke.

The guitar-shaped video game controller may optionally be arranged such that the knuckle is defined by the neck and the yoke is defined by the body.

The guitar-shaped video game controller may optionally be arranged such that at least a portion of the cable passes through an opening in the latch connector, such that sliding of the latch connector between the retracted and deployed positions does not contact said at least a portion of the cable that passes through the opening in the latch connector.

The guitar-shaped video game controller may optionally be arranged such that the neck defines a conduit that extends through the opening in the latch connector, the conduit having a passage through which the cable passes, the conduit inhibiting contact between the latch connector and the cable when sliding the latch connector between the retracted and deployed positions.

The guitar-shaped video game controller may optionally be arranged such that in the folded position at least a portion of the neck is disposed adjacent a rear surface of the body.

BRIEF DESCRIPTION OF THE DRAWINGS

FIG. 17 shows a partial view of the neck and body of the video game controller of FIG. 14 with a bottom cover of the neck and body removed to show internal components.

DETAILED DESCRIPTION

Figure 1:
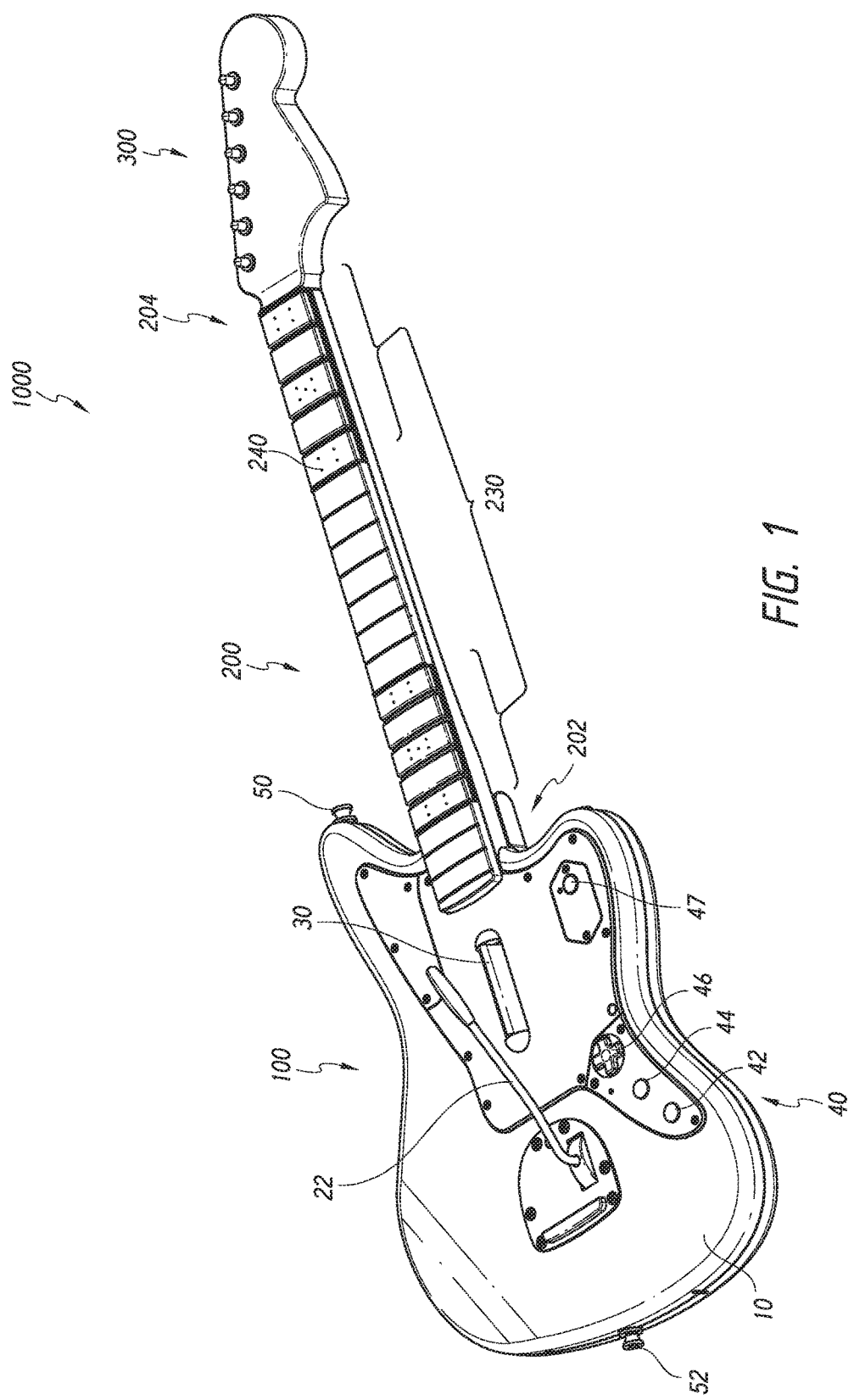
FIG. 1 is a perspective front view of one embodiment of a video game controller in an extended position.
Figure 2:
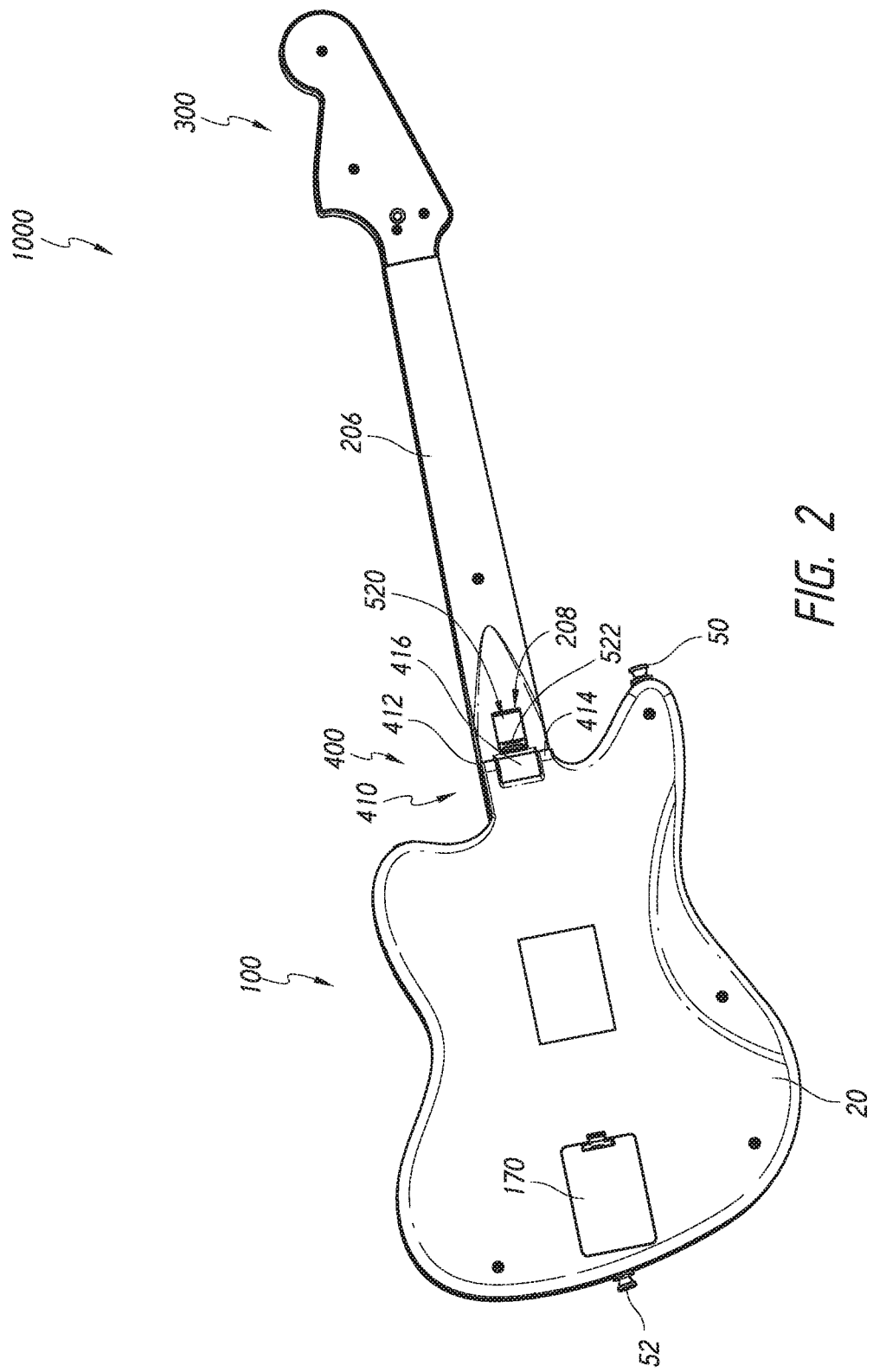
FIG. 2 is a rear view of the video game controller of FIG. 1.
Figure 3:
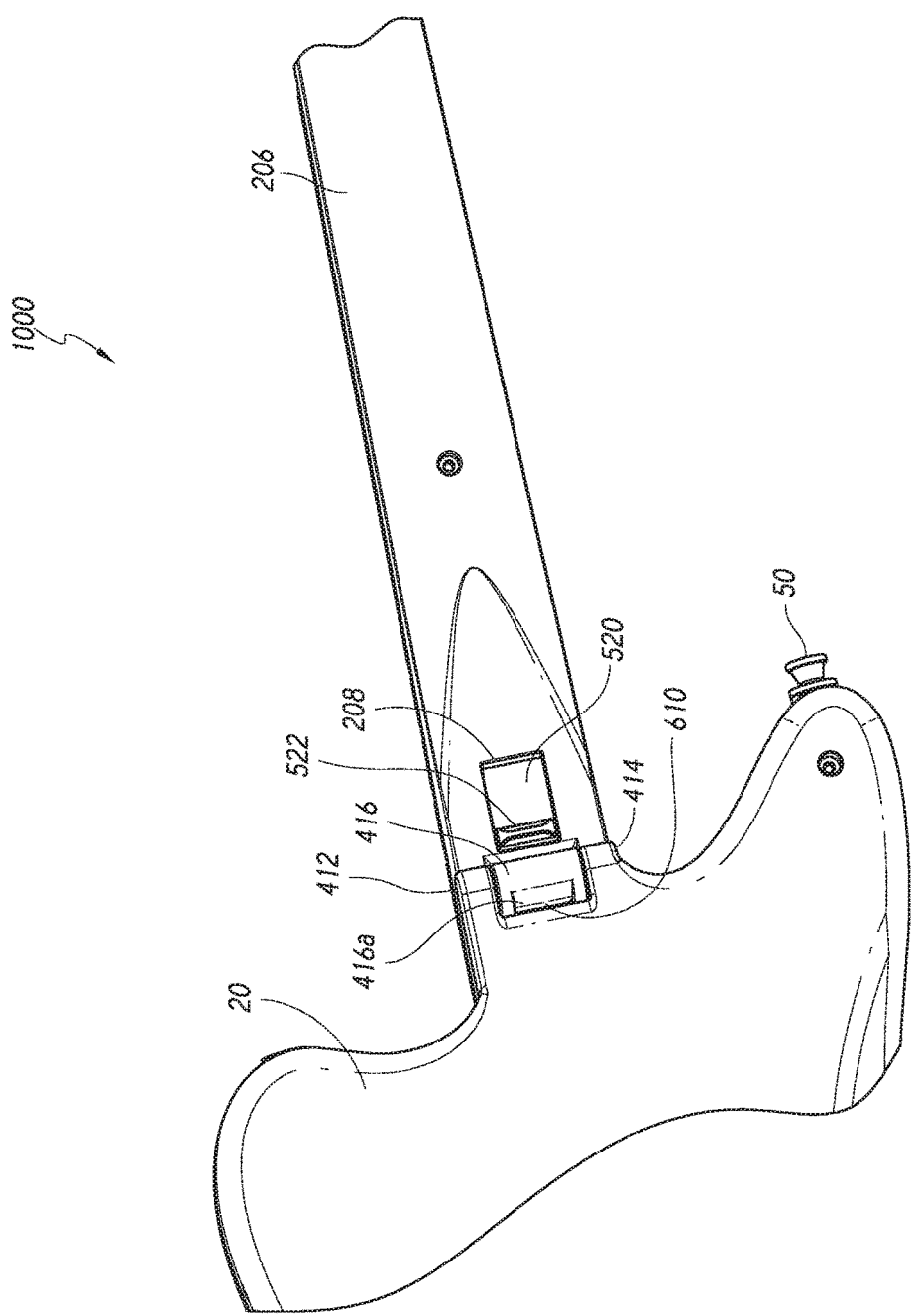
FIG. 3 is an enlarged view of a portion of the video game controller of FIG. 2.

FIGS. 1-2 show one embodiment of a video game controller. In the illustrated embodiment, the video game controller is a guitar-shaped video game controller 1000 ("controller"). The controller 1000 has a body 100, a neck 200 and a headstock 300.

The body 100 has a shape resembling a body of the guitar, and includes a front surface or cabinet 10 and a rear surface or cabinet 20. The body 100 also optionally includes a whammy bar 22, a strum bar 30, strap pegs 50, 52, and input buttons 40. In the illustrated embodiment, the input buttons 40 include an options button 42, a share button 44, a D-pad 46 and a guide button 47. In other embodiments, the input buttons 100 can be more or fewer than those shown in FIG. 1.

The neck 200 has a shape that resembles a neck of a guitar, and extends from a proximal portion 202 to a distal portion 204. The neck 200 includes a fret board 205 with fretboard dots 240 and a plurality of fret buttons 230. The headstock 300 has a shape that resembles a headstock of a guitar. Therefore, a user playing a video game with the controller 1000 can pretend they are playing an actual guitar while playing the video game.

With reference to FIG. 2, the controller 1000 includes a hinge assembly 400 that advantageously allows the neck 200 to pivot between an extended position (shown in FIGS. 1-2) and a folded position (shown, for example, in FIGS. 8, 10-13) relative to the body 100. For example, the neck 200 can be in the folded position when packaged or for storage, allowing for a smaller package or storage space to be used, and can readily be moved to the extended position by the user when the user wants to use the controller 1000 to play a video game.

The hinge assembly 400 includes a yoke 410 that has a pair of arms 412, 414 and a knuckle 416 that extends between and is pivotally coupled to the arms 412,414 by a pin (417 in FIG. 7A-7B) or pair of bosses (417a in FIG. 17) that extend between one or both of the arms 412, 414 and the knuckle 416, as discussed further below. In the illustrated embodiment, the yoke 410 is defined by the body 100 and the knuckle 416 is defined by the neck 200. In another embodiment, the yoke 410 is defined by the neck 200 and the knuckle 416 is defined by the body 100.

With reference to FIG. 2, the neck 200 has an opening 208 defined on a rear surface 206 of the neck 200. Advantageously, a user can access a latch connector 520 of a latch assembly 500 (described further below) through the opening 208 to actuate (e.g., slide) the latch connector 520 between a first position, such as a retracted position, and a second position, such as a deployed position, as discussed further below. For example, the user can contact a ridge 522 of the latch connector 520 (e.g., with the user's finger(s)) to move the latch connector 520 relative to the neck 200.

Figure 4:
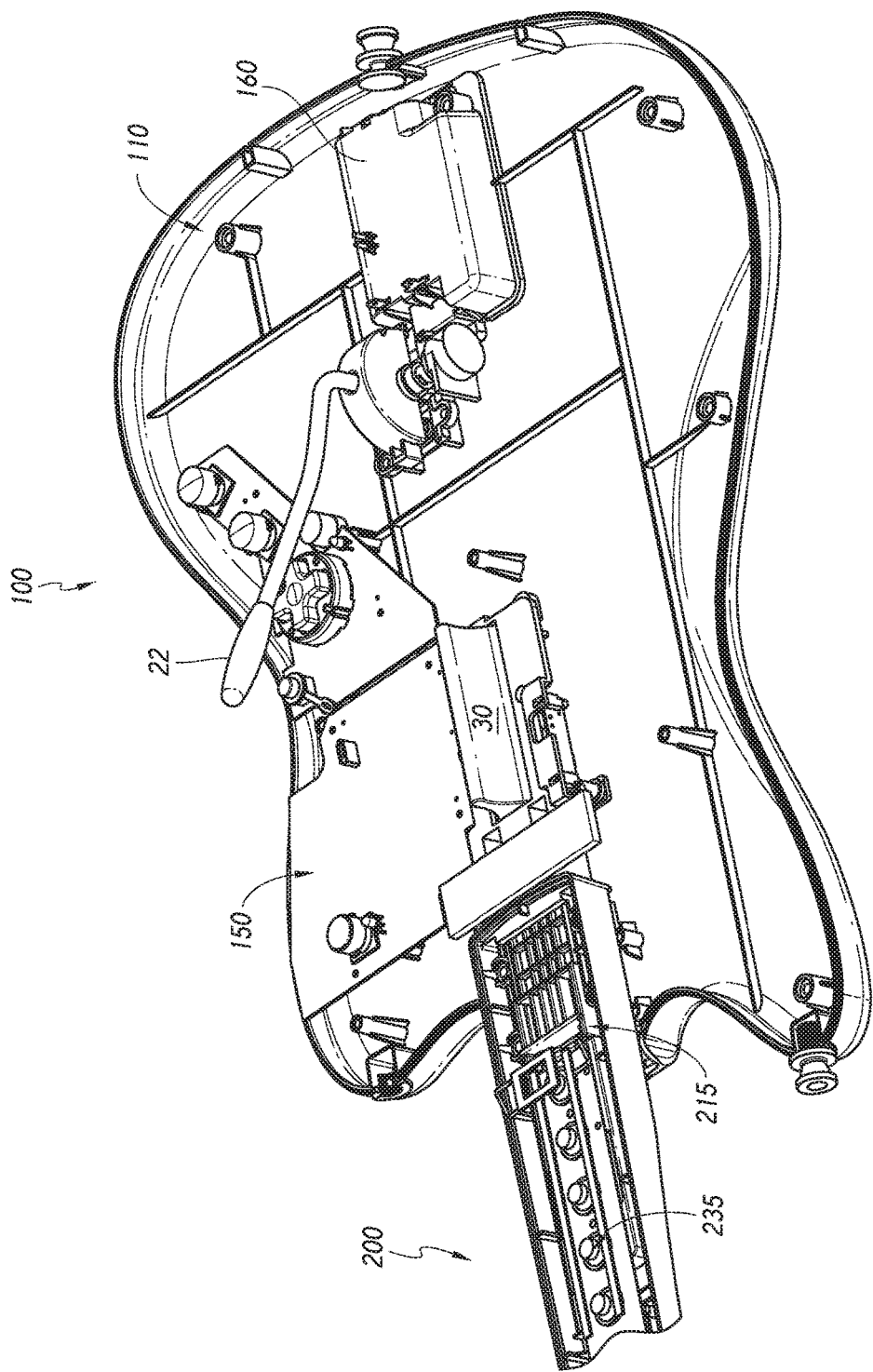
FIG. 4 is a partial view of the video game controller of FIG. 1, with a top cover of the body and neck removed to show internal components.

FIGS. 3-13 show one embodiment of the controller 1000. FIG. 4 shows the body 100 with the front surface or cabinet 10 removed to illustrate components housed in the body 100, including one or more printed circuit boards (PCBs) 150 and a battery compartment 160 that is accessed via a cover 170 (see FIG. 6).

Figure 5:
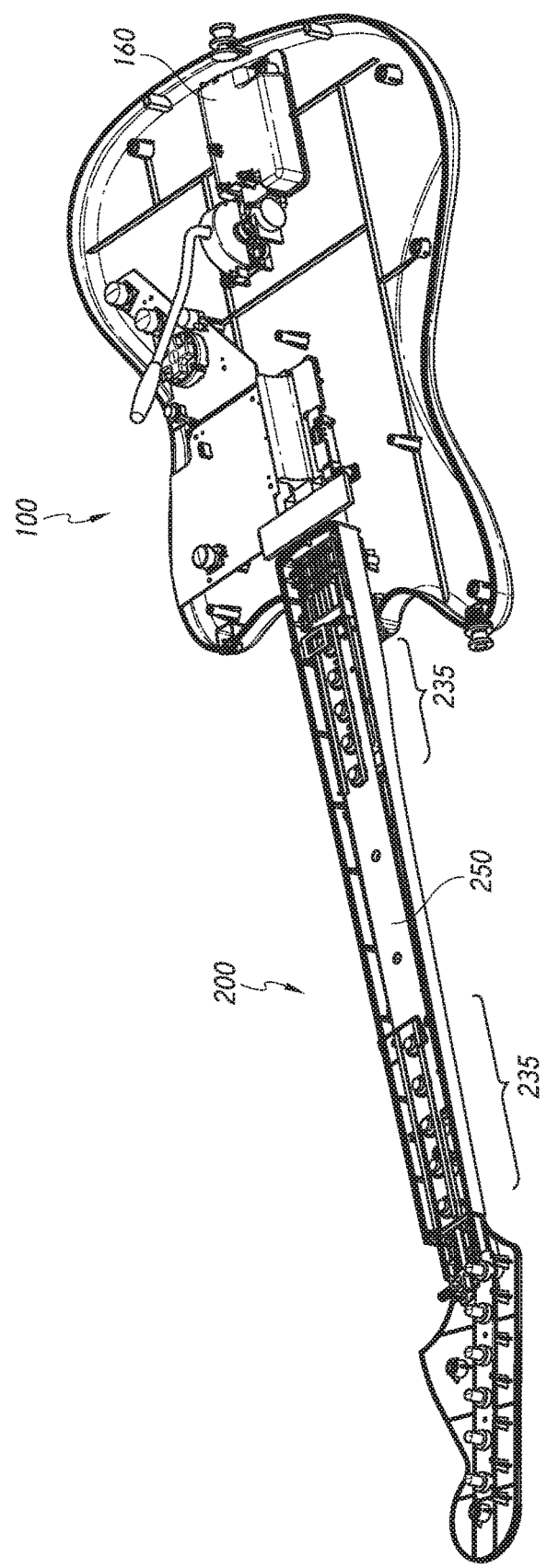
FIG. 5 is a view of a body of the video game controller of FIG. 1, excluding a top cover of the body and neck of the controller to show internal components.
Figure 6:
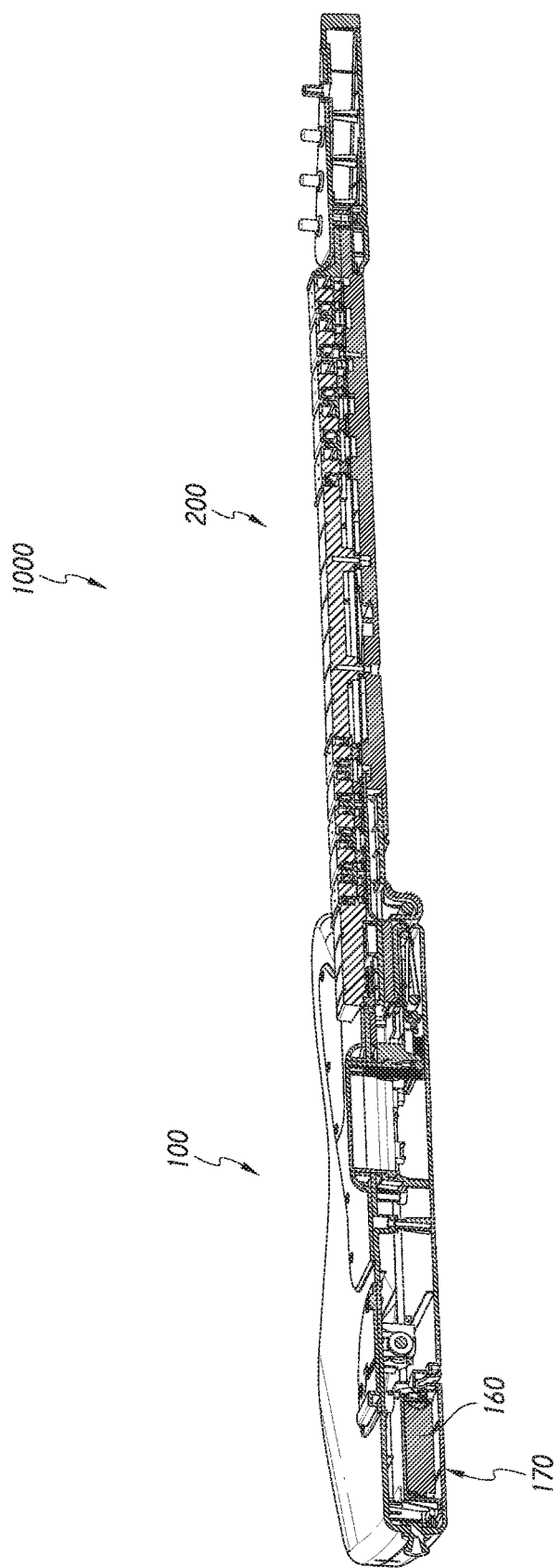
FIG. 6 is a longitudinal cross-sectional view of the video game controller of FIG. 1.

In the illustrated embodiment, a ribbon cable 610 extends between the body 100 and the neck 200. Advantageously, the ribbon cable 610 provides an electrical connection between the neck 200 and body 100 irrespective of the position of the neck 200 relative to the body 100 (e.g., irrespective of whether the neck 200 is in the extended or folded positions), and therefore the ribbon cable 610 maintains an electrical connection between the neck 200 and the body 100. The ribbon cable 610 can provide an electrical connection between the fret buttons 230 and the body 100 (e.g., between the fret buttons 230 and the PCBs 150). As shown in FIG. 5, the neck 200 can have one or more fret button pads 235 that underlie the fret buttons 230. The fret button pads 235 can be disposed on one or more circuit boards 250, and the circuit board 250 can be electrically connected with an end of the ribbon cable 610 via a PCB connector 215. Accordingly, the signal provided by the user when pressing the fret buttons 230 can be communicated via the circuit board 250 and ribbon cable 610 to the body 100 (e.g., to the PCBs 150 in the body 100, which can then communicate the signals to the video game (e.g., via a wired or wireless connection).

Figure 7A:
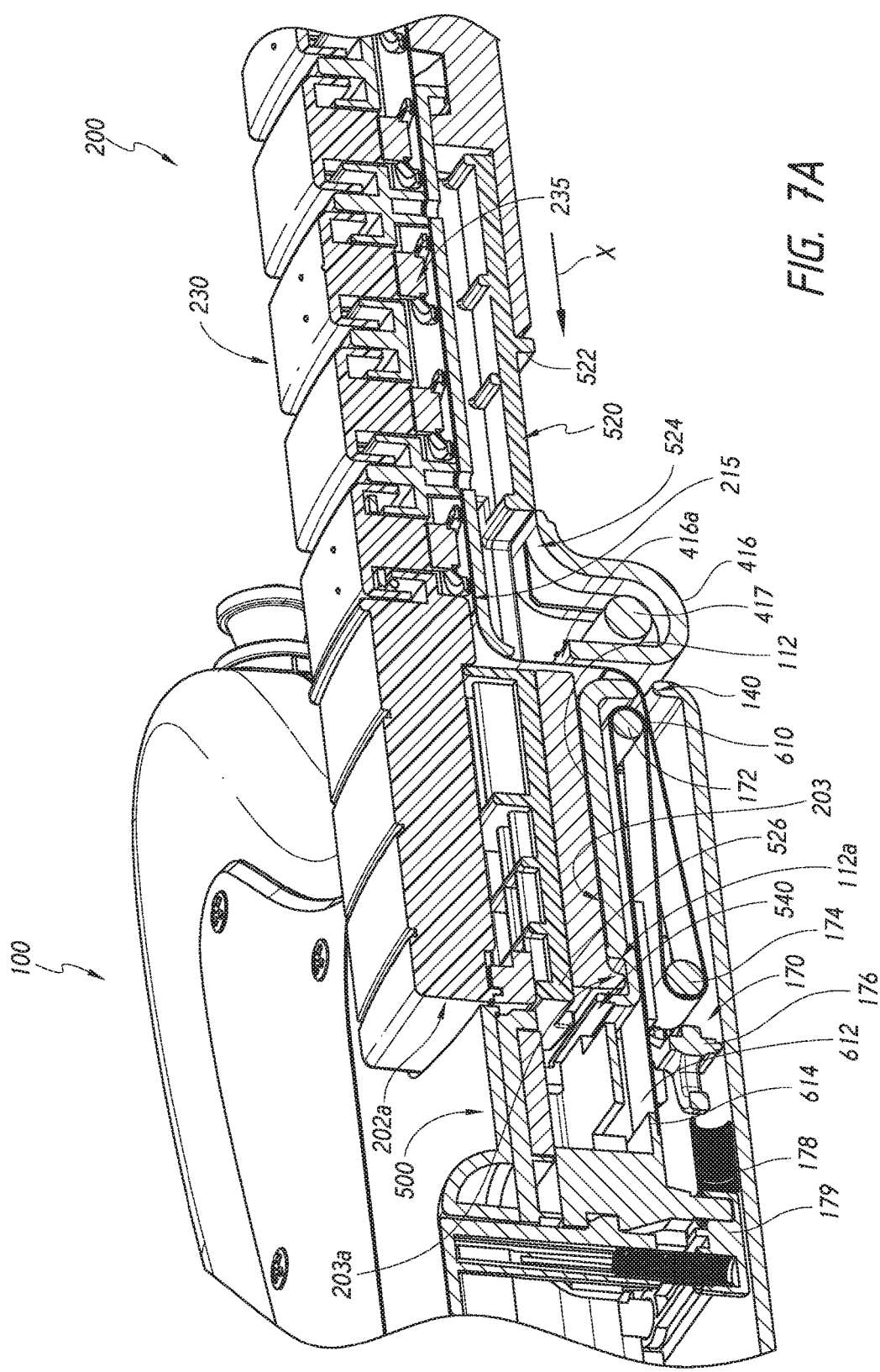
FIG. 7A is partial cross-sectional view of the neck and body of the video game controller of FIG. 6 with the latch mechanism in the retracted position.
Figure 7B:
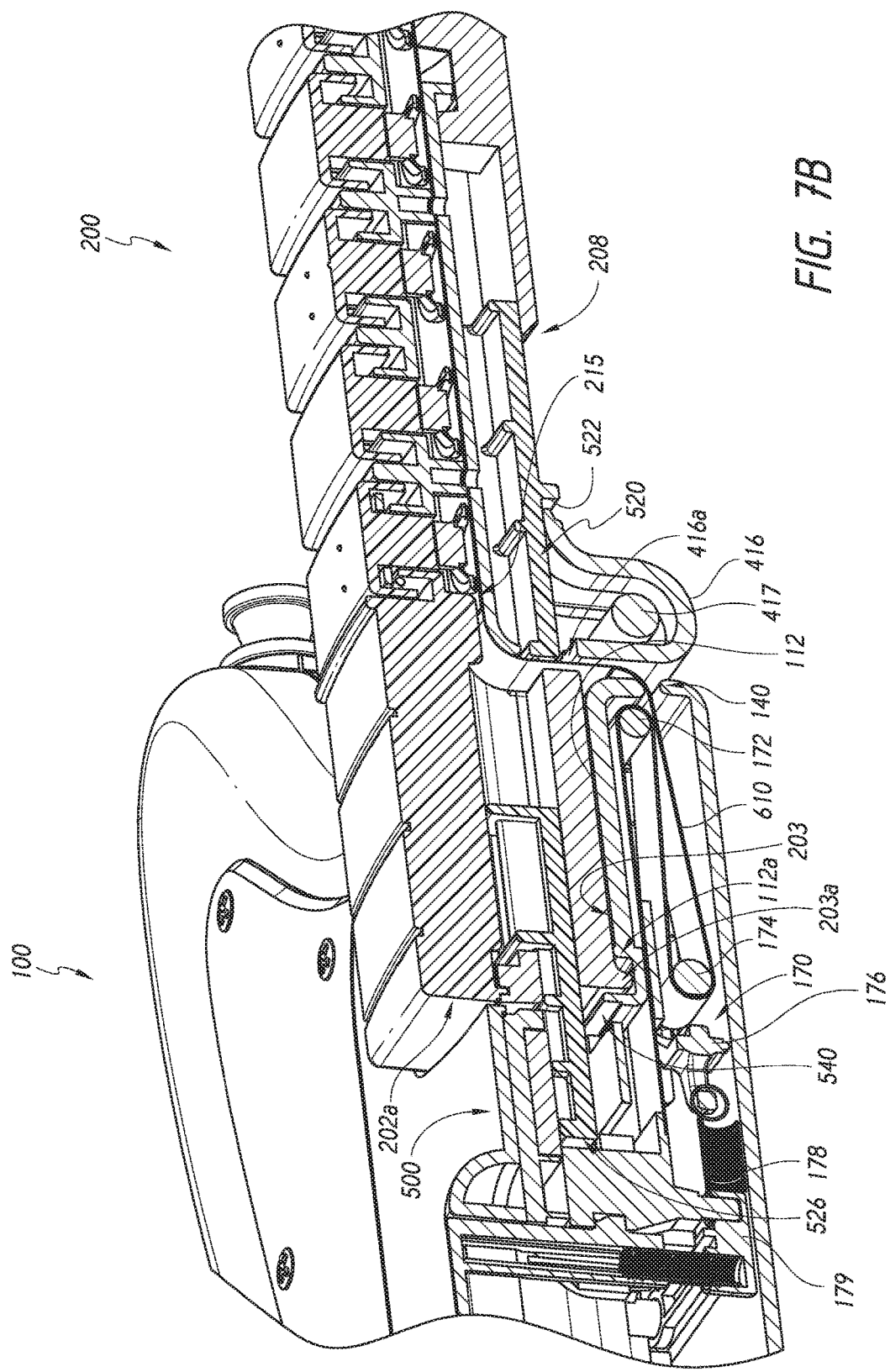
FIG. 7B is a partial cross-sectional view of the neck and body of the video game controller of FIG. 6 with the latch mechanism in the deployed position.

As shown in FIGS. 7A-7B, the ribbon cable 610 extends into the neck 200 through an opening 416a in the knuckle 416 and extends into the body 100 via an opening 140. An end 612 of the ribbon cable 610 connects to a PCB connector 614 in the body 100 (e.g., where the PCB connector 614 is connected to the one or more PCBs 150).

A tension assembly 170 is disposed in the body 100 and advantageously applies a tension force on the ribbon cable 610 to inhibit slack in the ribbon cable 610 as the neck 200 is pivoted between the extended and the folded positions, which advantageously inhibits (e.g., prevents) damage to the ribbon cable 610 during operation of the controller 1000. The tension assembly 170 includes a first pin or roller 172 (e.g., distal pin) and a second pin or roller 174 (e.g., proximal pin), where the ribbon cable 610 wraps around at least a portion of the first and second pins 172, 174 (e.g., in a zig zag manner) between the opening 140 and the connector 614. In the illustrated embodiment, the first pin 172 is fixed and the second pin 174 is part of a hook structure 176 that is attached by a spring 178 to a support member 179 to thereby spring load the second pin 174 and allow the second pin 174 to move axially along a longitudinal direction of the controller 1000. The spring 178 applies a force on the second pin 174 that biases the second pin 174 toward the support 179, and thereby applies a tension force on the ribbon cable 610 that wraps about the second pin 174, so that there is substantially no slack in the portion of the ribbon cable 610 that extends between the opening 140 in the body 100 and the opening 416a in the knuckle.

Figure 8:
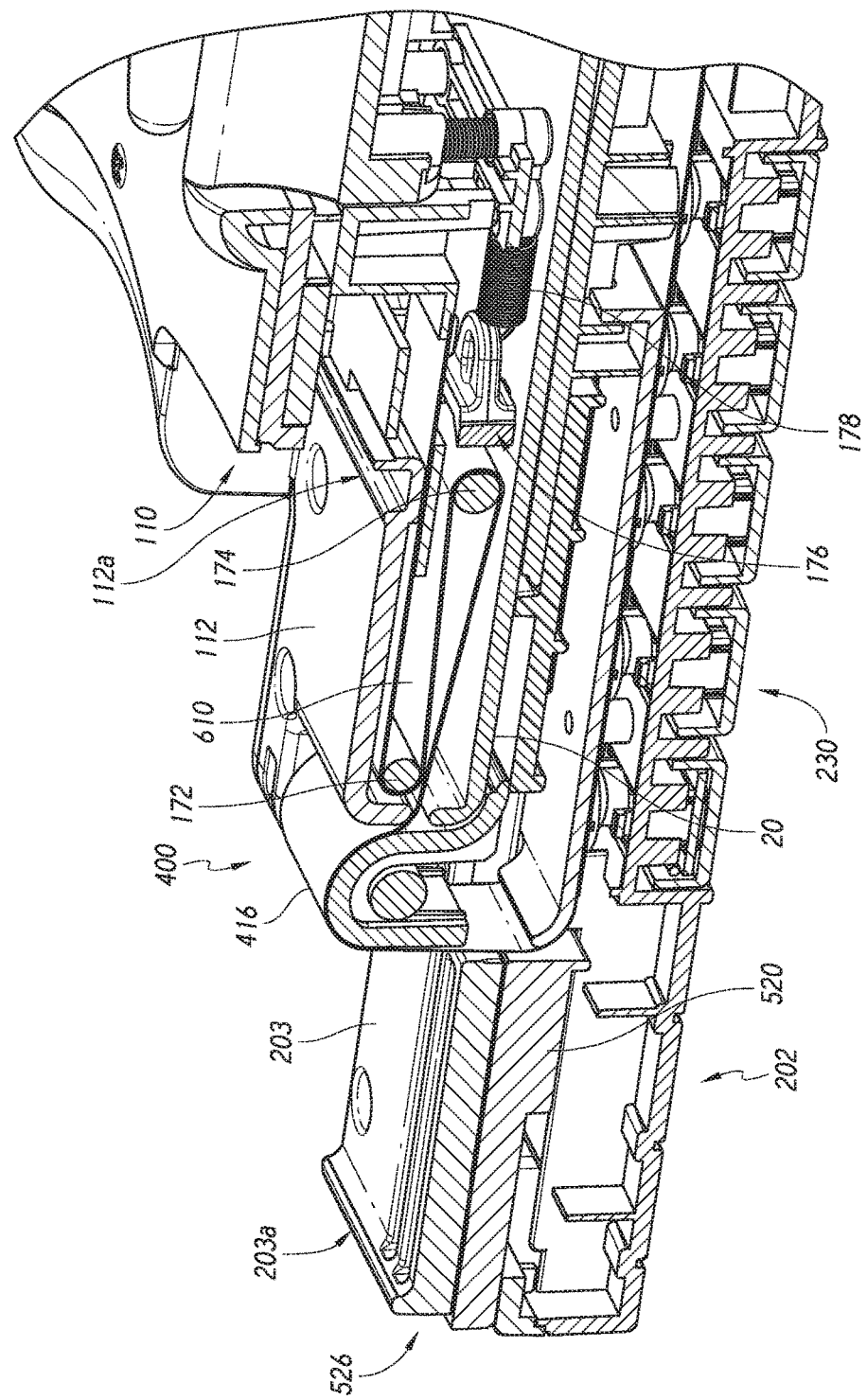
FIG. 8 is a partial cross-sectional view of the neck and body of the video game controller of FIG. 6 with the neck in the folded position relative to the body.
Figure 9:
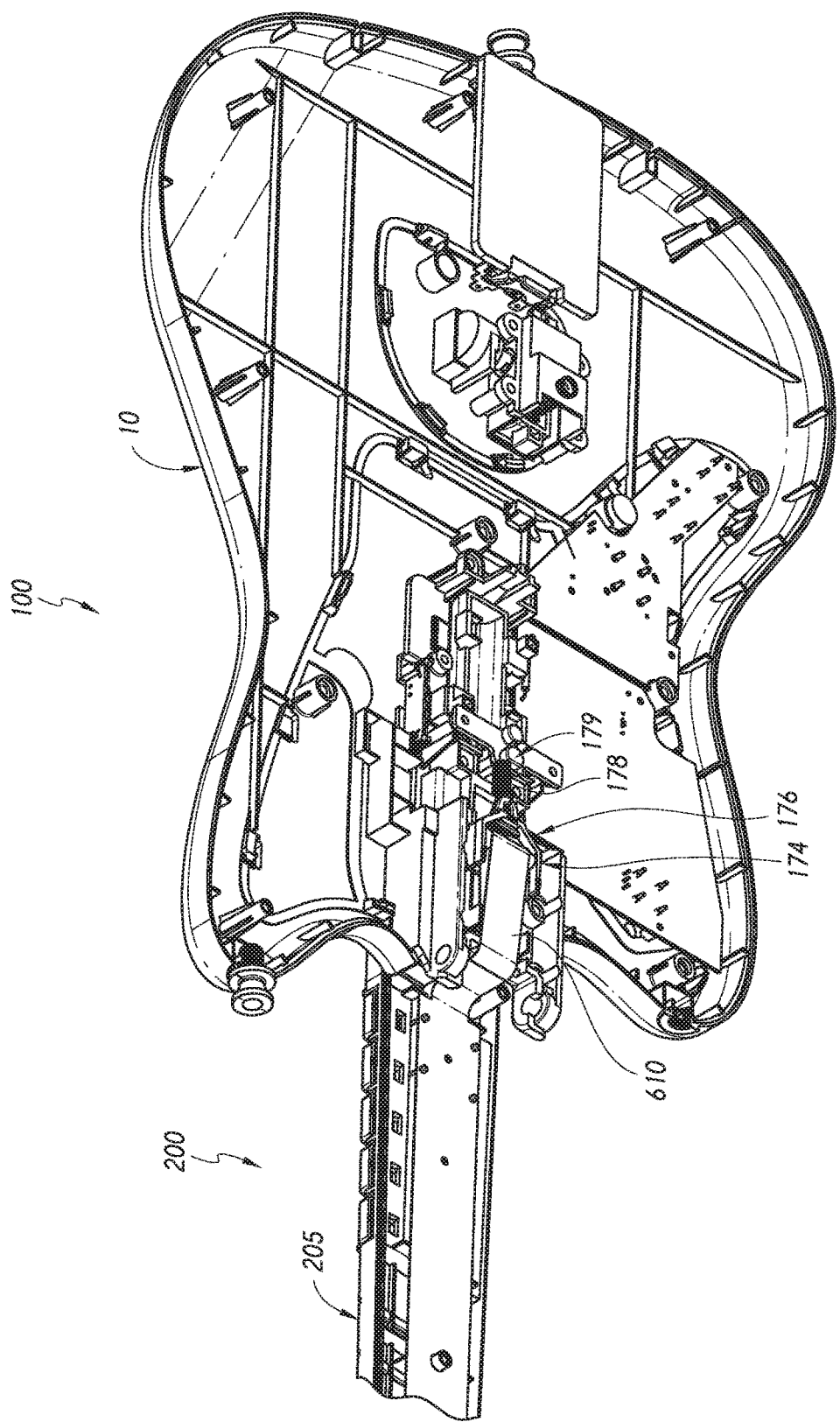
FIG. 9 is a partial view of the video game controller of FIG. 6 with a bottom cover of the body and neck removed to show internal components.
Figure 10:
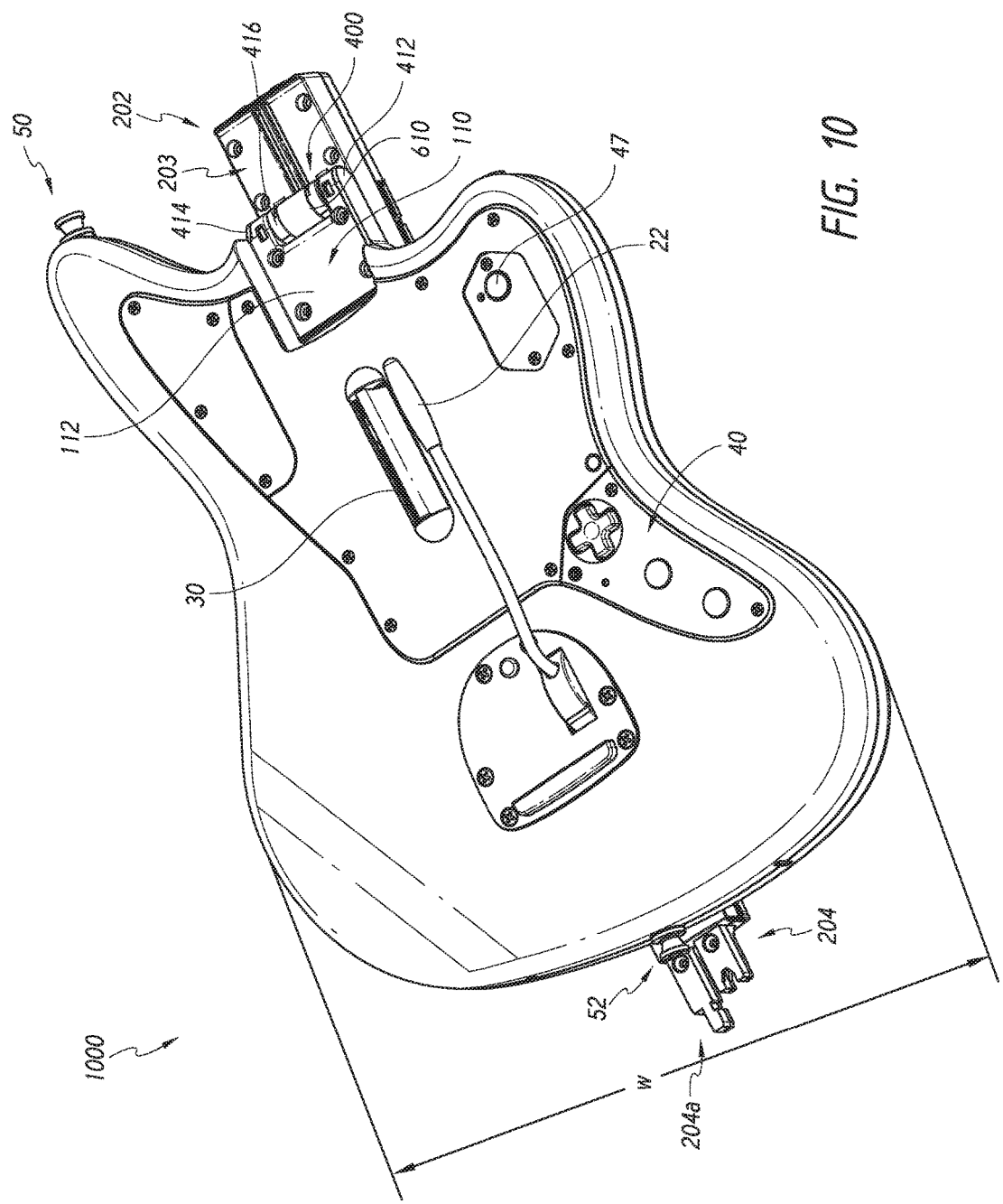
FIG. 10 is a top perspective view of the video game controller of FIG. 6 with the neck in the folded position.
Figure 11:
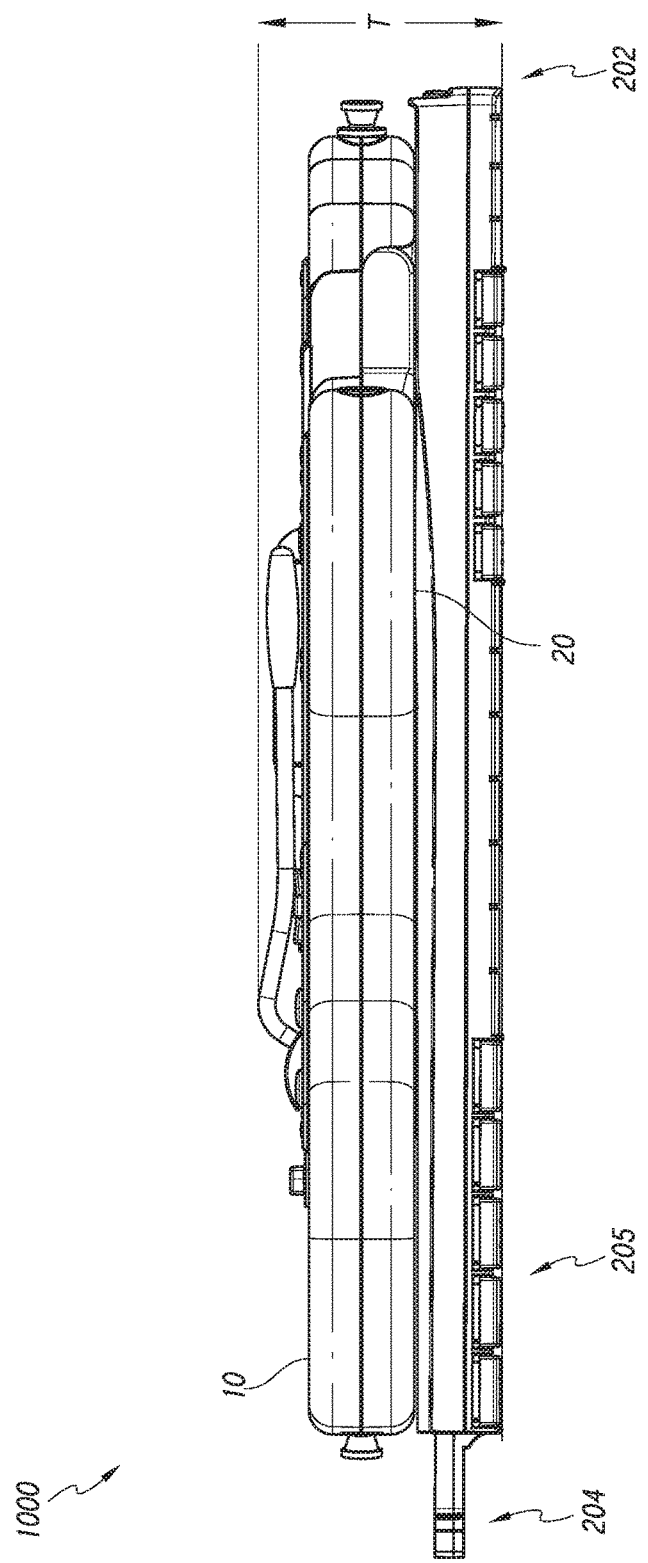
FIG. 11 is a side view of the video game controller of FIG. 6 with the neck in the folded position.
Figure 12:
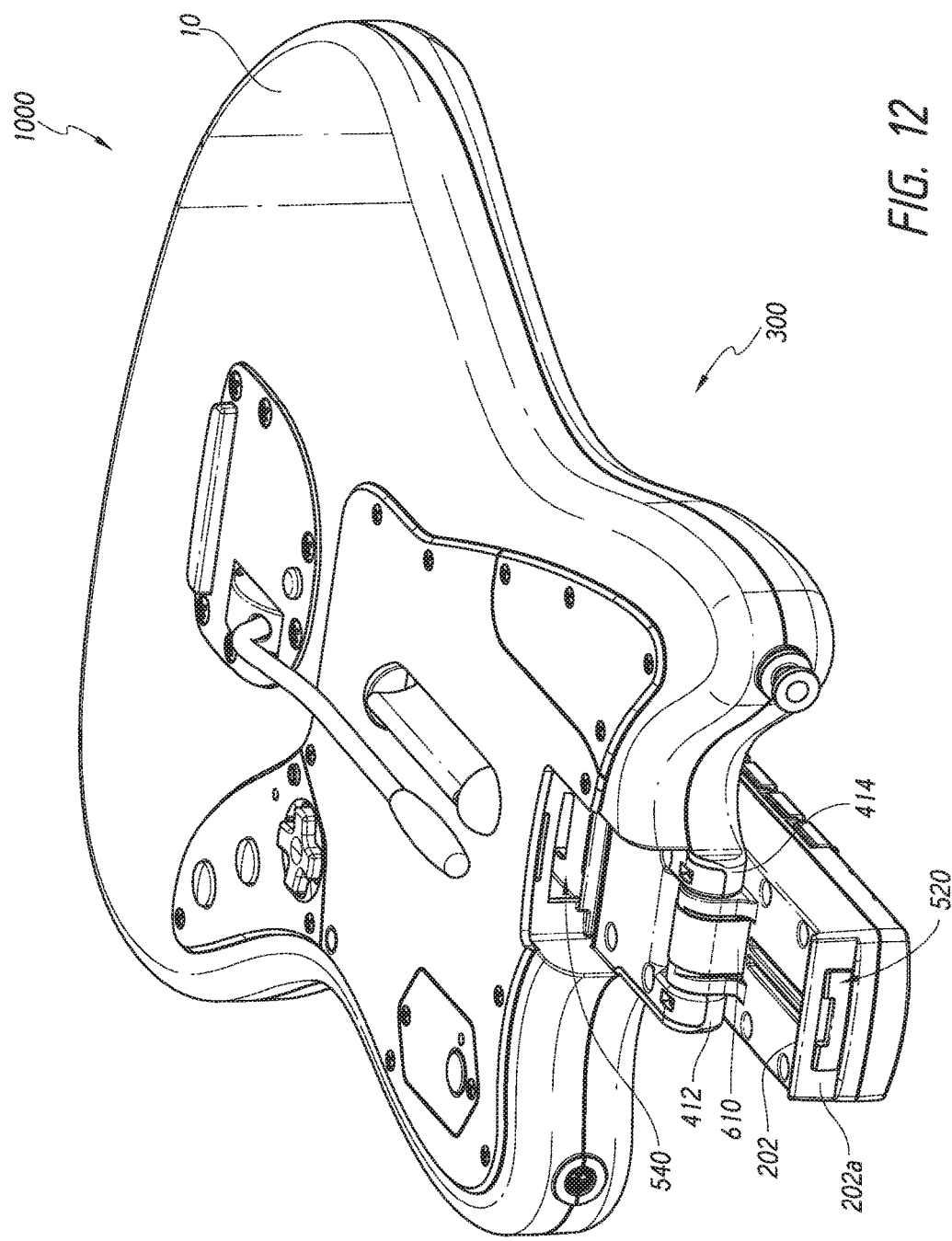
FIG. 12 is an end view of the video game controller of FIG. 6 with the neck in the folded position.
Figure 13:
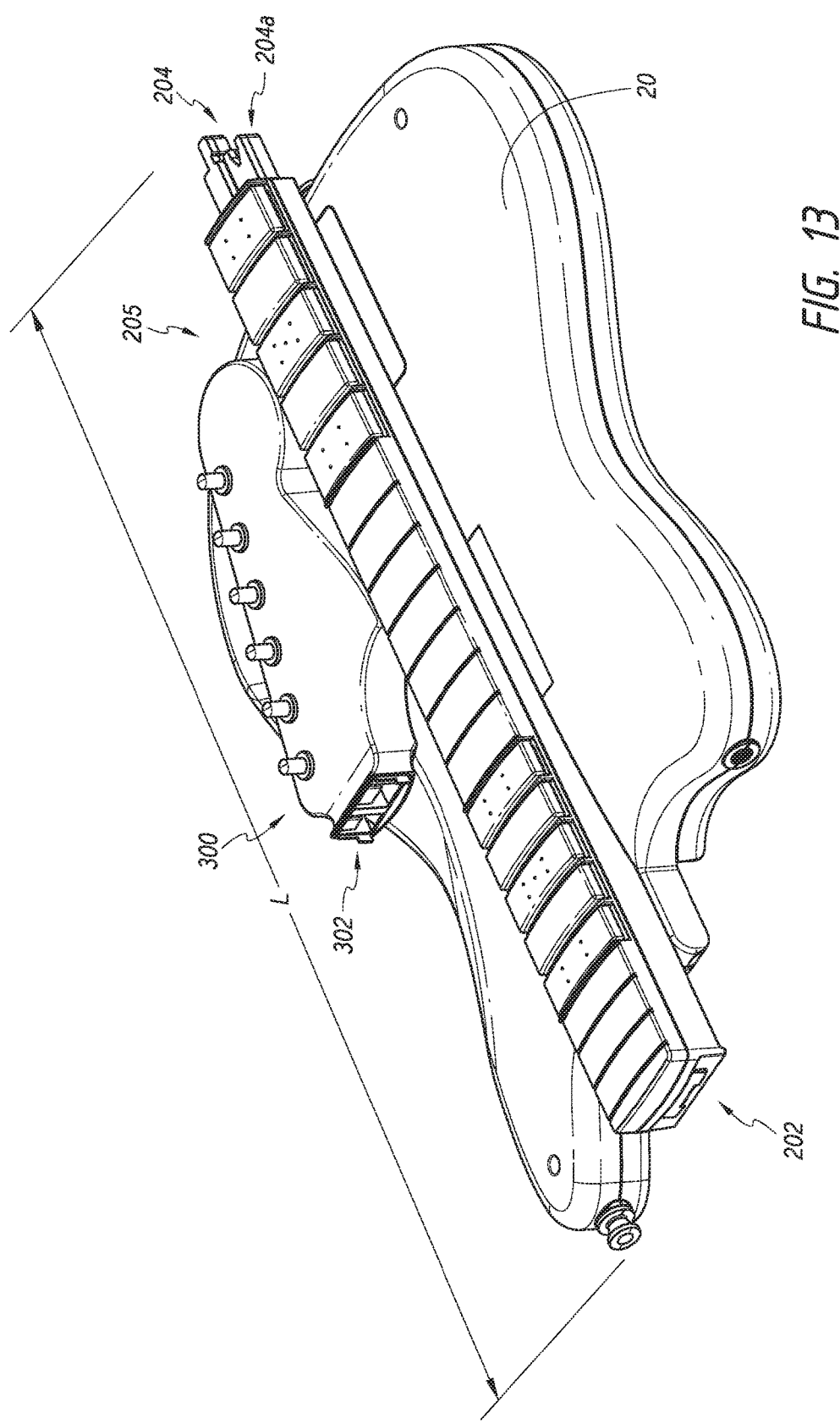
FIG. 13 is a bottom perspective view of the video game controller of FIG. 6 with the neck in the folded position.
Figure 14:
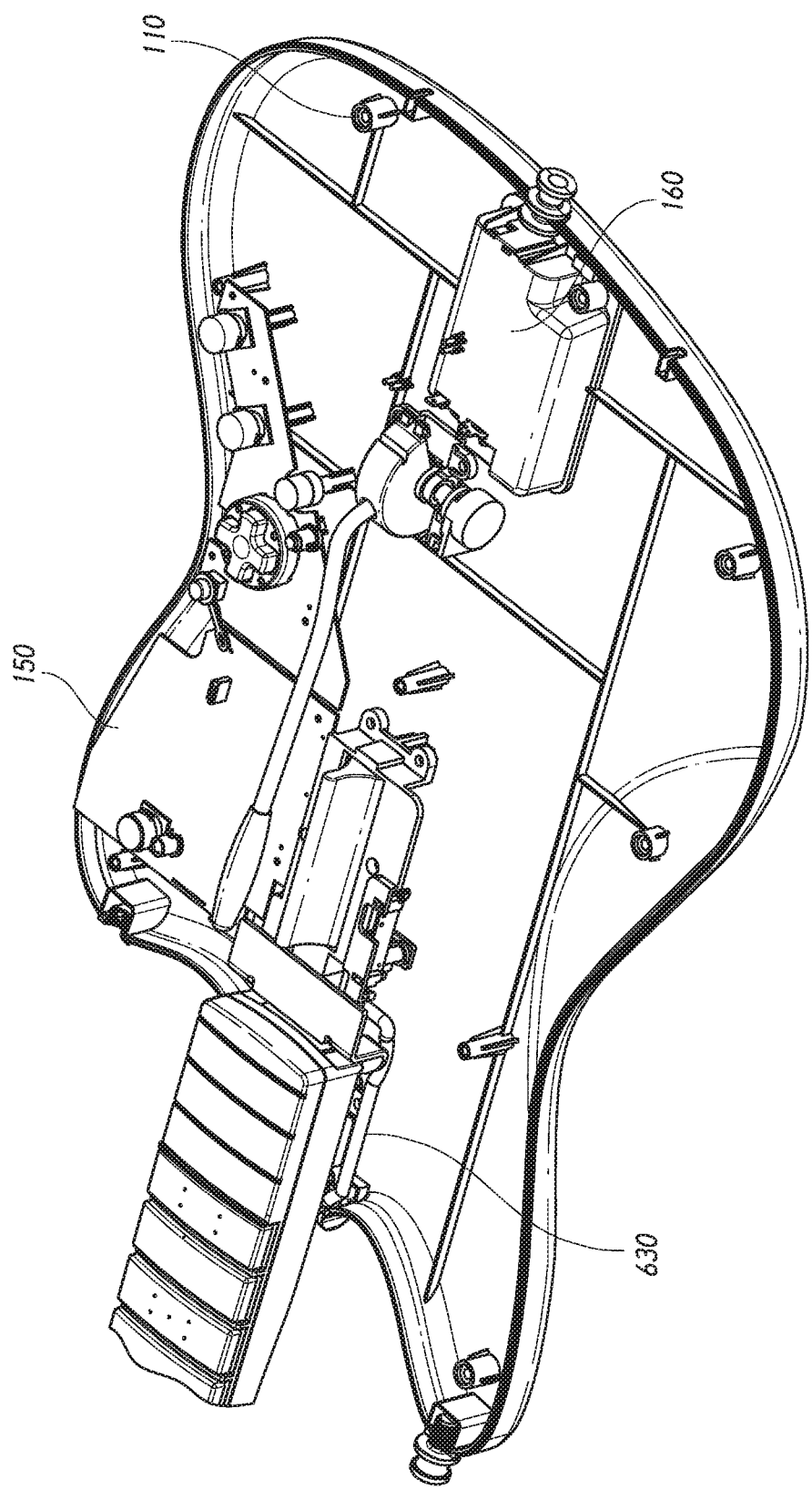
FIG. 14 shows a partial view of a body of another embodiment of a video game controller with a top cover removed to show internal components.

As the neck 200 is moved to the folded position, the ribbon cable 610 is pulled out of the opening 140 by the rotation of the knuckle 416, but the second pin 174 applies a tension force on the ribbon cable 610 (via the tension force applied by the spring 178) to maintain the ribbon cable 610 substantially taut between the second pin 174 and the PCB connector 215. As shown in FIGS. 7A-8, the spring 178 is in an extended position when the neck 200 is in the folded position due to a larger length of the ribbon cable 610 extending out of the body 100 through the opening 140. The farther the neck 200 is rotated toward the folded position, the greater the length of the ribbon cable 610 that extends out of the body 100 and the greater the tension force applied on the ribbon cable 610 by the spring 178 (via the second pin 174). In one embodiment, the second pin 174 and hook structure 176 can be disposed in a channel so that they are substantially limited to move in only the fore-aft direction (e.g., to substantially inhibit movement of the second pin 174 and hook structure 176 in a lateral direction). In another embodiment, the tension assembly 170 can have only one pin about which the ribbon cable 610 is wrapped, where said pin is spring loaded and biased away from the opening 140 in the body 100.

With continued reference to FIGS. 7A-7B, a latch assembly 500 includes the latch connector 520 and a connector 540 in the body 100. In the illustrated embodiment, the connector 540 is a slot 540 in the body 100. The slot 540 receives a distal portion 526 of the latch connector 520 when it is slid in a direction X toward the body 100 such that it extends past a proximal end 202a of the neck 200 to thereby lock the neck 200 in the extended position to the body 100. In one embodiment, the distal portion 526 of the latch connector 520 can engage a ridge or protrusion in the slot 540 to lock the position of the latch connector 520 in the slot 540 and inhibit inadvertent disengagement between the latch connector 520 and the slot 540.

In the extended position, the proximal portion 202 of the neck 200 extends into a recess 110 of the body 100 and a proximal surface 203 (see e.g., FIG. 8) of the neck 200 is disposed adjacent a surface 112 of the recess 110. Additionally, a ridge 203a of the proximal portion 202 of the neck 200 extends into a groove 112a in the surface 112 to facilitate the coupling of the neck 200 to the body 100. In one embodiment, the ridge 203a and groove 112a are press-fit when coupled together to inhibit movement of the neck 200 relative to the body 100 prior to sliding the latch connector 520 to the deployed position. In one embodiment, in the first or retracted position the distal portion 526 of the latch connector 520 can be flush with the proximal end 202a of the neck 200. In another embodiment, in the first or retracted position the distal portion 526 of the latch connector 520 can be disposed distal of the proximal end 202a of the neck 200. As shown in FIG. 8, in one embodiment where the neck 200 is in the folded position relative to the body 100, the neck 200 can be adjacent (e.g., in contact with) the bottom surface or cabinet 20 of the body 100. In another embodiment, the latch connector 520 can be disposed in the body 100 and slide out of the body 100 to engage a connector (e.g., slot) in a proximal end 202a of the neck 200. In such an embodiment, the window 208 can instead be defined in the body 100 to allow the user to access the latch connector to move the connector between the retracted and deployed positions to lock the neck 200 to the body 100 or allow the neck 200 to pivot relative to the body 100.

FIGS. 10-13 show the controller 1000 with the neck 200 in the folded position relative to the body 100. In the folded position, the controller 1000 can have a width W of between about 200 mm and about 300 mm, in some embodiments about 275 mm. In the folded position, the controller 1000 can have a length L of between about 400 mm and about 500 mm, in some embodiments about 430 mm. In the folded position, the controller 1000 can have a thickness T of between about 50 mm and about 100 mm, in some embodiments about 75 mm. The controller 1000 in the folded position can be packaged or stored in a box or space having a length of between about 400-500 mm, in some embodiments about 450 mm, a width of between about 200-300 mm, in some embodiments about 280 mm, and a thickness of between about 75 mm-150 mm, in some embodiments about 100 mm.

As shown in FIGS. 10-13, in the folded position, the headstock 300 can be removed from the distal end 204 of the neck 200 so that the distal connector 204a (e.g., one or more prongs) of the neck 200 is decoupled from the connector 302 (e.g., one or more slots) of the headstock 300. The neck 200 can be folded relative to the body 100 so that it is disposed adjacent the bottom surface of cabinet 20 of the body 100.

FIGS. 14-19 show another embodiment of the controller 1000. The controller 1000 illustrated in FIGS. 14-19 is similar to the controller 100 shown in FIGS. 3-13, except as noted below. Thus, the reference numerals used to designate the various components of the controller 1000 in FIGS. 14-19 are identical to those used for identifying the corresponding components of the controller 1000 in FIGS. 3-13.

Figure 15:
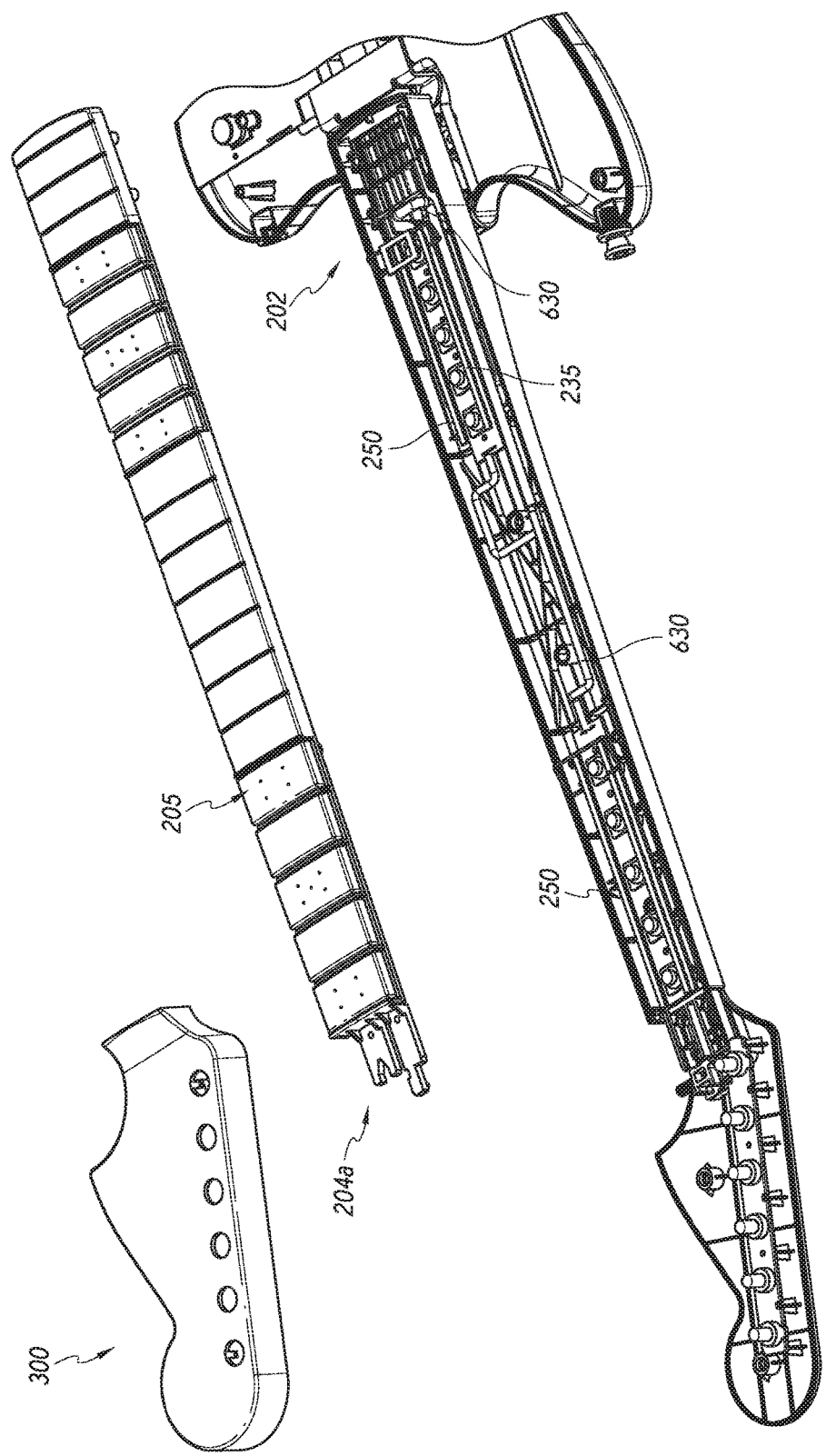
FIG. 15 shows a partial view of a neck of the video game controller of FIG. 14 with a top cover of the neck removed to show internal components.
Figure 16:
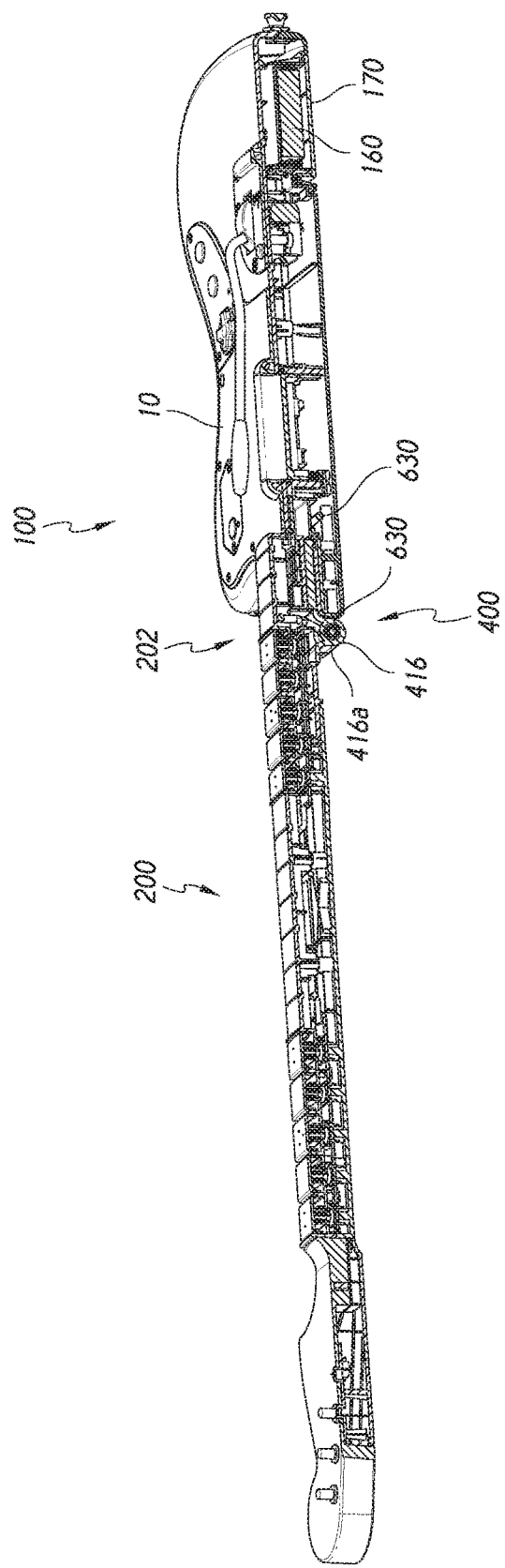
FIG. 16 shows a longitudinal cross-sectional view of the video game controller of FIG. 14.

In the illustrated embodiment, a cable 630 (e.g., electrical cable) extends between the neck 200 and the body 100. As shown in FIG. 15, the cable 630 can connect with the one or more circuit boards 250 on which the fret button pads 235 are disposed. In the illustrated embodiment, two circuit boards 250 for the fret button pads 235 are disposed in the neck 200, and electrically connected by the cable 630. The cable 630 extends through the hinge assembly 400 and into the body 100 (e.g., so that no portion of the cable 630 is exposed outside of the controller 1000). The cable 630 extends from the proximal portion 202 of the neck 200 into the knuckle 416, and passes through a channel 416a in the knuckle 416 into one of the arms 414 of the yoke 410 through an opening in the arm 414a, to thereby pass into the body 100 where the cable 630 connects with one or more PCBs 150 in the body. Accordingly, the signal provided by the user when pressing the fret buttons 230 that overlie the fret button pas 235 can be communicated via the circuit board(s) 250 and cable 630 to the body 100 (e.g., to the PCBs 150 in the body 100, which can then communicate the signals to the video game (e.g., via a wired or wireless connection).

Figure 18A:
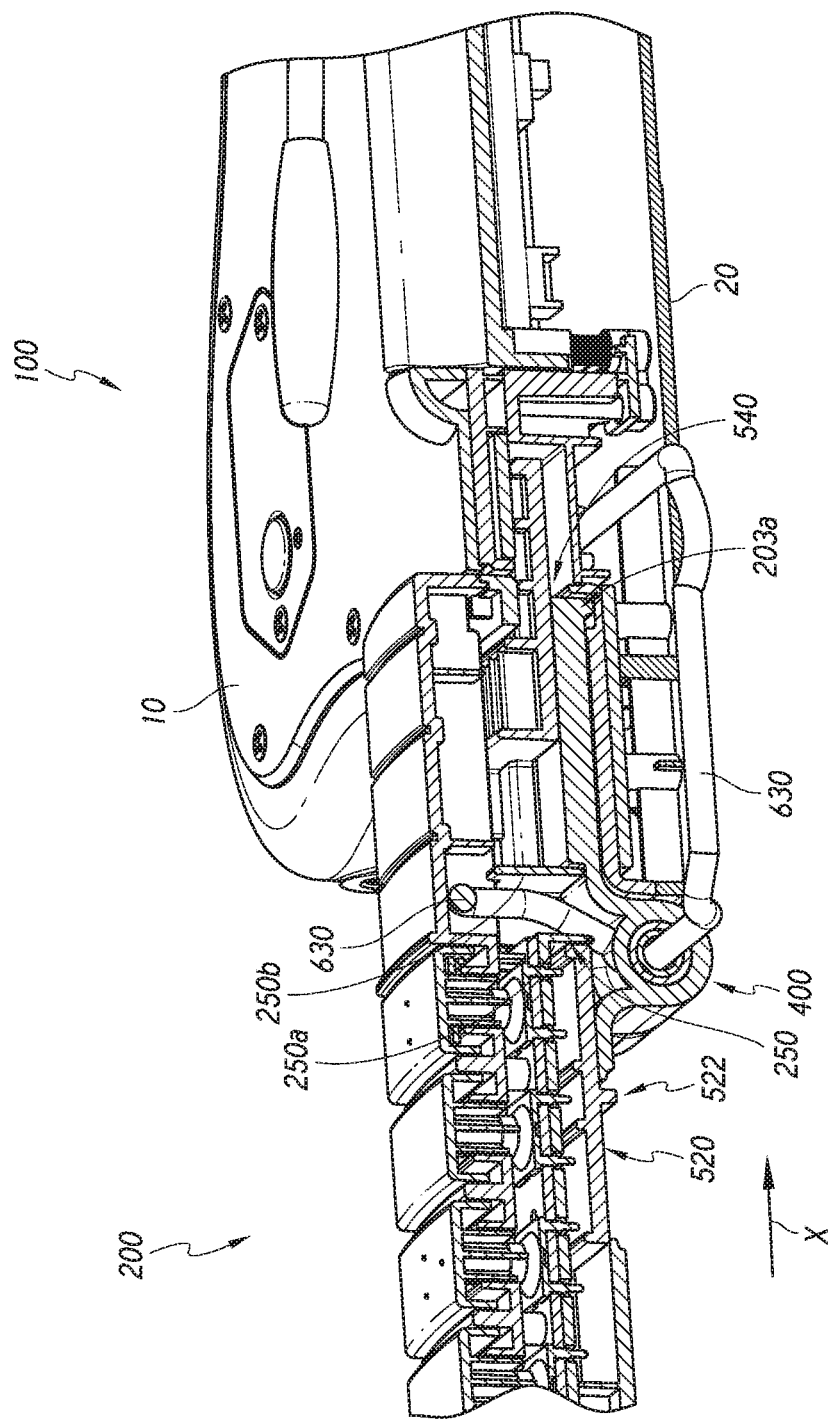
FIG. 18A shows a partial cross-sectional view of the neck and body of the video game controller of FIG. 14, showing routing of a cable between the body and the neck of the controller, with the latch mechanism in the deployed position.
Figure 18B:
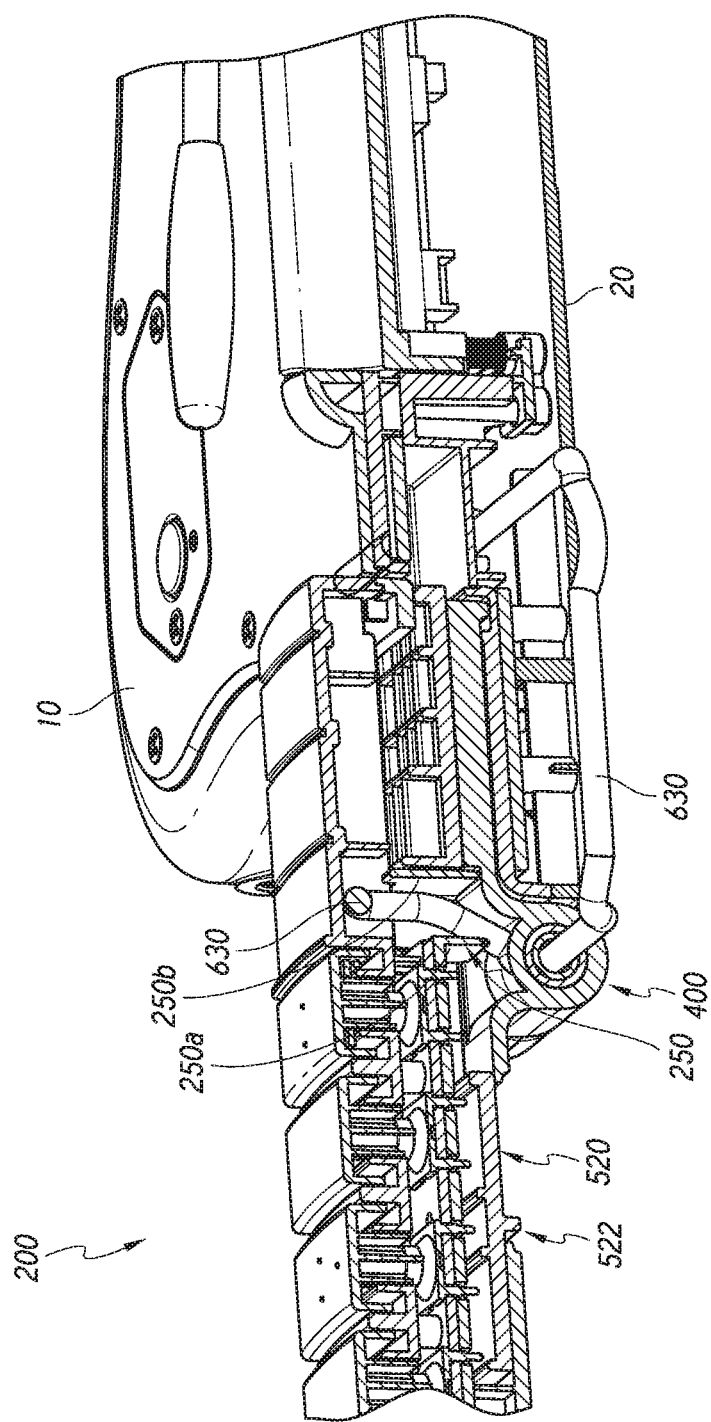
FIG. 18B shows a partial cross-sectional view of the neck and body of the video game controller of FIG. 14, showing routing of a cable between the body and the neck of the controller, with the latch mechanism in the retracted position.
Figure 19:
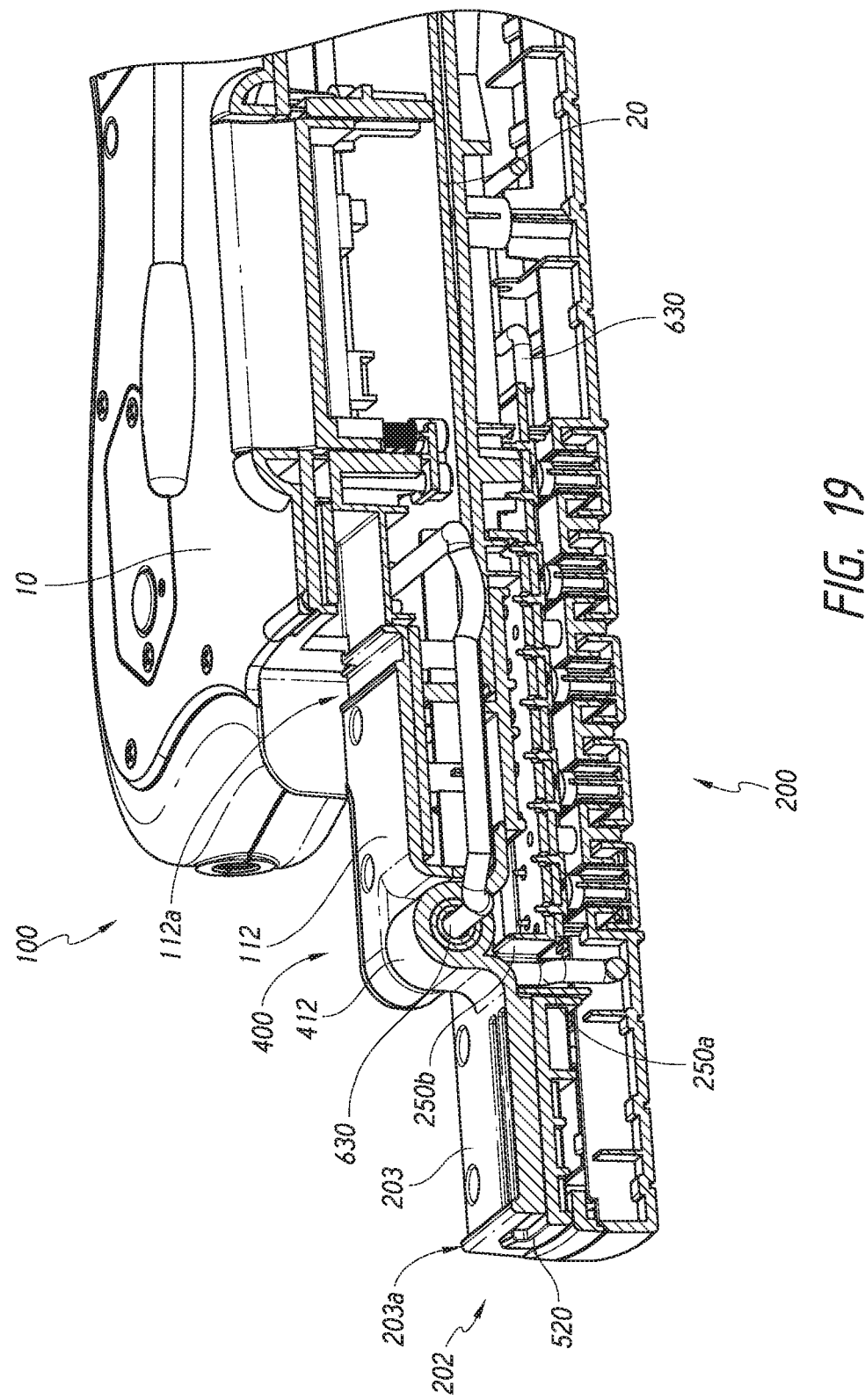
FIG. 19 shows a partial cross-sectional view of the neck and body of the video game controller of FIG. 14, showing routing of a cable between the body and the neck of the controller, with the neck in the folded position relative to the body.

With reference to FIGS. 17-19, the cable 630 passes from the proximal portion 202 of the neck 200 into the knuckle 416 via an opening 252 in a conduit 250, defined by walls 250a, 250b, that extends through an opening 524 in the latch connector 520. The conduit 250 advantageously protects the cable 630 from damage by the latch connector 520 while the latch connector 520 is moved between the retracted position (shown in FIG. 18B), where the neck 200 is unlatched from the body 100 so that the neck 200 is able to pivot relative to the body 100, and the deployed position (shown in FIG. 18A) along direction X, where the neck 200 is latched to (or locked to) the body 100 with the neck 200 in the extended position. As the latch connector 520 is slid between the retracted and deployed positions, the latch connector 520 can slide until a portion of the latch connector 520 contacts one of the walls 250a, 250b, which prevents the latch connector 520 from contacting (and possibly damaging) the cable 630 that extends through the conduit 250. As discussed above, in one embodiment, the distal portion 526 of the latch connector 520 can engage a ridge or protrusion in the slot 540 to lock the position of the latch connector 520 in the slot 540 and inhibit inadvertent disengagement between the latch connector 520 and the slot 540. Advantageously, the cable 630 provides an electrical connection between the neck 200 and body 100 irrespective of the position of the neck 200 relative to the body 100 (e.g., irrespective of whether the neck 200 is in the extended position, as shown in FIGS. 18A18B, or in the folded position, as shown in FIG. 19), and therefore the cable 630 maintains an electrical connection between the neck 200 and the body 100. Additionally, the cable 630 passes through the hinge assembly 400 such that the cable 630 is not twisted while the neck 200 is pivoted relative to the body 100. Optionally, one or both of the knuckle 416 and arms 412, 414 of the yoke 410 can have bearings through which the cable 630 passes from the knuckle 416 into one of the arms 414 and into the body 100.

Figure 20:
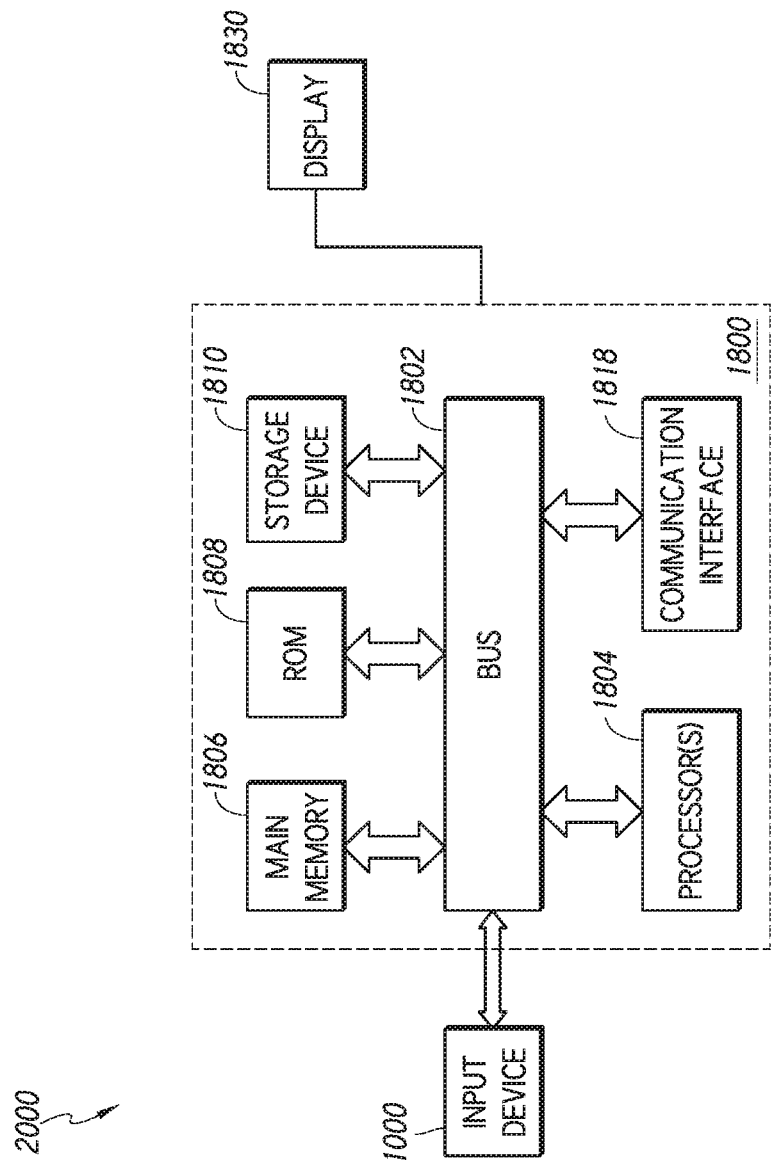
FIG. 20 is a schematic block diagram of a video game system that includes a video game controller.

FIG. 20 shows a block diagram of a video game system 2000 utilizing the video game controller 1000. The system 2000 includes a console 1800 that communicates with the controller 1000 via a wired or wireless connection. The console 1800 can include a bus 1802, one or more processors 1804, a main memory 1806, a read-only memory (ROM) 1808, a storage device 1810 and a communication interface 1818. The one or more processors 1804 can execute video game instructions, for example in a memory 1806 or ROM 1808 that communicates with the one or more processors 1804. The instructions can be stored in the storage device 1810, and transferred to the memory 1806 and/or ROM 1808 as commanded by the processor(s) 1804. The console 1800 can receive inputs from the controller 1000 (i.e., from the user pressing on the fret buttons 230 or operating the whammy bar 22 or strum bar 30), and can communicate with a display 1830 via the communication interface 1818 to provide display data (e.g., images) to the display (e.g., computer monitor, television, etc.).

Although this disclosure describes certain embodiments and examples of video game controllers, it will be understood by those skilled in the art that many aspects of the methods and devices shown and described in the present disclosure may be differently combined and/or modified to form still further embodiments or acceptable examples. All such modifications and variations are intended to be included herein within the scope of this disclosure. Indeed, a wide variety of designs and approaches are possible and are within the scope of this disclosure. No feature, structure, or step disclosed herein is essential or indispensable. Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The language of the claims is to be interpreted broadly based on the language employed in the claims and not limited to the examples described in the present specification or during the prosecution of the application, which examples are to be construed as non-exclusive.

Some embodiments have been described in connection with the accompanying drawings. However, the figures are not drawn to scale, unless indicated otherwise. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

In summary, various illustrative embodiments and examples of video game controllers have been disclosed. Although the video game controllers have been disclosed in the context of those embodiments and examples, it will be understood by those skilled in the art that this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

What is claimed is:

1. A guitar-shaped video game controller, comprising:
a body having a shape that resembles a guitar body and one or more control inputs;
a neck pivotally attached to the body via a hinge, the neck configured to pivot between an extended position and a folded position relative to the body;
a latch assembly actuatable by a user to lock the neck in the extended position to the body, the latch assembly comprising a latch connector configured to slide between a first position that allows the neck to pivot relative to the body and a second position in which the neck is locked in the extended position to the body; and
an electrical cable that extends between and electrically connects the neck and the body, the electrical cable configured to extend through at least a portion of the hinge along a pivot axis of the hinge and to maintain an electrical connection between the neck and the body when the neck is in the extended and the folded positions.

2. The controller of claim 1, wherein the latch connector is disposed in a proximal portion of the neck.

3. The controller of claim 1, wherein in the first position the latch connector is retracted and in the second position the latch connector extends past a proximal end of the neck.

4. The controller of claim 2, wherein the proximal portion of the neck includes an opening through which at least a portion of the latch connector is accessible, the latch connector being actuatable by the user through the opening to slide the latch connector between the first and second positions.

5. The controller of claim 2, wherein the latch connector is a male connector that engages a female connector in the body.

6. The controller of claim 5, wherein the female connector is a slot in the body.

7. The controller of claim 1, further comprising a headstock detachable from a distal end of the neck.

8. The controller of claim 1, wherein the hinge comprises a yoke with a pair of arms and a knuckle that extends between the arms of the yoke, the knuckle configured to rotate relative to the arms when the neck is pivoted between the extended and the folded positions.

9. The controller of claim 8, wherein at least a portion of the cable passes through a channel in the knuckle and an opening in one of the arms of the yoke.

10. The controller of claim 8, wherein the knuckle is defined by the neck and the yoke is defined by the body.

11. The controller of claim 1, wherein at least a portion of the cable passes through an opening in the latch connector, such that sliding of the latch connector between the retracted and deployed positions does not contact said at least a portion of the cable that passes through the opening in the latch connector.

12. The controller of claim 11, wherein the neck defines a conduit that extends through the opening in the latch connector, the conduit having a passage through which the cable passes, the conduit inhibiting contact between the latch connector and the cable when sliding the latch connector between the retracted and deployed positions.

13. The controller of claim 1, wherein in the folded position at least a portion of the neck is disposed adjacent a rear surface of the body.

14. A guitar-shaped video game controller, comprising:
a body having a shape that resembles a guitar body and one or more control inputs;
a neck pivotally attached to the body via a hinge, the neck configured to pivot between an extended position and a folded position relative to the body;
a latch assembly actuatable by a user to lock the neck in the extended position to the body, the latch assembly comprising a latch connector in the neck that is configured to slide between a retracted position that allows the neck to pivot relative to the body and a deployed position in which the latch connector extends past a proximal end of the neck and engages a slot in the body to thereby lock the neck to the body; and
an electrical cable that extends between and electrically connects the neck and the body, the electrical cable extending through at least a portion of the hinge along a pivot axis of the hinge and configured to maintain an electrical connection between the neck and the body when the neck is in the extended and the folded positions.

15. The controller of claim 14, wherein a proximal portion of the neck includes an opening through which at least a portion of the latch connector is accessible, the latch connector being actuatable by the user through the opening to slide the latch connector between the retracted and deployed positions.

16. The controller of claim 14, further comprising a headstock detachable from a distal end of the neck.

17. The controller of claim 14, wherein the hinge comprises a yoke with a pair of arms and a knuckle that extends between the arms of the yoke, the knuckle configured to rotate relative to the arms when the neck is pivoted between the extended and the folded positions.

18. The controller of claim 17, wherein at least a portion of the cable passes through a channel in the knuckle and an opening in one of the arms of the yoke.

19. The controller of claim 17, wherein the knuckle is defined by the neck and the yoke is defined by the body.

20. The controller of claim 14, wherein at least a portion of the cable passes through an opening in the latch connector, such that sliding of the latch connector between the retracted and deployed positions does not contact said at least a portion of the cable that passes through the opening in the latch connector.

21. The controller of claim 20, wherein the neck defines a conduit that extends through the opening in the latch connector, the conduit having a passage through which the cable passes, the conduit inhibiting contact between the latch connector and the cable when sliding the latch connector between the retracted and deployed positions.

22. The controller of claim 14, wherein in the folded position at least a portion of the neck is disposed adjacent a rear surface of the body.

* * * * *